US010535273B2

(12) United States Patent
Namgoong et al.

(10) Patent No.: US 10,535,273 B2
(45) Date of Patent: Jan. 14, 2020

(54) UNMANNED AERIAL VEHICLE AND METHOD FOR RECONFIGURING GEOFENCE REGION THEREOF USING ELECTRONIC DEVICE

(71) Applicant: Samsung Electronics Co., Ltd., Gyeonggi-do (KR)

(72) Inventors: Boram Namgoong, Gyeonggi-do (KR); Jihyun Park, Gyeonggi-do (KR); Kyunghee Lee, Seoul (KR); Juyeong Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/834,313

(22) Filed: Dec. 7, 2017

(65) Prior Publication Data

US 2018/0165970 A1    Jun. 14, 2018

(30) Foreign Application Priority Data

Dec. 9, 2016    (KR) .......................... 10-2016-0167741

(51) Int. Cl.
*G08G 5/00* (2006.01)
*B64D 47/08* (2006.01)
(Continued)

(52) U.S. Cl.
CPC ........... *G08G 5/006* (2013.01); *B64C 39/024* (2013.01); *B64D 47/08* (2013.01); *G08G 5/0008* (2013.01);
(Continued)

(58) Field of Classification Search
USPC ........................................................ 701/20
See application file for complete search history.

(56) References Cited

U.S. PATENT DOCUMENTS 8,941,489 B2    1/2015  Sheshadri et al.
9,412,278 B1 *  8/2016  Gong ...................... G06F 16/29
(Continued)

FOREIGN PATENT DOCUMENTS

KR   10-2016-0101545 A    8/2016
WO       2016/154936 A1   10/2016
WO       2016/154939 A1   10/2016

OTHER PUBLICATIONS

International Search Report dated Feb. 20, 2018.
European Search Report dated Oct. 15, 2019.

*Primary Examiner* — Tyler D Paige
(74) *Attorney, Agent, or Firm* — Cha-Reiter, LLC.

(57) ABSTRACT

An unmanned aerial vehicle (UAV) may include: a flight body; a camera installed on the flight body; a sensor module mounted inside the flight body to sense nearby surroundings; a wireless communication module mounted inside the flight body to wirelessly communicate with an external communication device; a processor mounted inside the flight body and electrically connected with the camera, the sensor module, and the wireless communication module; and a memory electrically connected with the processor. The memory may store instructions that, when the unmanned aerial vehicle is in flight, cause the processor to: identify a first geofence region; broadcast flight information on a periodic basis; receive flight information from a second unmanned aerial vehicle in flight; determine whether there is an overlap between the first geofence region and a second geofence region of the second unmanned aerial vehicle; and if so, reset the first geofence region so that the first geofence region does not overlap with the second geofence region.

20 Claims, 16 Drawing Sheets

(51) Int. Cl.
*H04W 4/021* (2018.01)
*B64C 39/02* (2006.01)

(52) U.S. Cl.
CPC .......... *G08G 5/0069* (2013.01); *H04W 4/021* (2013.01); *B64C 2201/127* (2013.01); *B64C 2201/146* (2013.01)

(56) References Cited

U.S. PATENT DOCUMENTS

| | | | |
|---|---|---|---|
| 2014/0172194 A1* | 6/2014 | Levien | B64C 39/024 |
| | | | 701/2 |
| 2014/0249692 A1 | 9/2014 | Levien et al. | |
| 2015/0323931 A1* | 11/2015 | Downey | G08G 5/006 |
| | | | 701/2 |
| 2016/0012730 A1 | 1/2016 | Jarrell | |
| 2016/0189549 A1 | 6/2016 | Marcus | |
| 2016/0225264 A1 | 8/2016 | Taveira | |
| 2016/0241707 A1 | 8/2016 | Lee et al. | |
| 2016/0266258 A1 | 9/2016 | Huang et al. | |
| 2016/0292696 A1 | 10/2016 | Gong et al. | |
| 2016/0325835 A1 | 11/2016 | Abuelsaad et al. | |
| 2016/0358432 A1 | 12/2016 | Branscomb et al. | |
| 2018/0165970 A1* | 6/2018 | Namgoong | G05D 1/04 |

* cited by examiner

UNMANNED AERIAL VEHICLE AND METHOD FOR RECONFIGURING GEOFENCE REGION THEREOF USING ELECTRONIC DEVICE

CLAIM OF PRIORITY

This application claims priority under 35 U.S.C. § 119(a) to Korean Patent Application No. 10-2016-0167741, filed on Dec. 9, 2016, in the Korean Intellectual Property Office, the entire disclosure of which is incorporated herein by reference.

TECHNICAL FIELD

The present invention relates to an unmanned aerial vehicle and method for reconfiguring geo-fencing for unmanned aerial vehicle using an electronic device.

BACKGROUND

In recent years, with the rapid development of flight control technology using software and communication technology, unmanned aerial vehicles have been utilized in various fields for aerial photography, exploration, and reconnaissance. Unmanned aerial vehicles, commonly known as a drone, is an aircraft without a human pilot aboard that are capable of flying with various degrees of autonomy using radio waves. As interest in aerial photography technology has increased recently, various types of unmanned aerial vehicles have been widely developed.

Meanwhile, geo-fencing for unmanned aerial vehicle plays a major role in security for unmanned aerial vehicles by allowing to fly within a designated region, which is set based on a location-based service. The geofence is a virtual perimeter for a real-would geographical area which may be set in a circle or square shape on a map on the basis of GPS position information, user settings, or a distance limiting scheme based on the RF signaling range or the distance from the user.

However, the geofence region constraining the flight zone is set before the start of flight. As such, it may be difficult to change the preset geofence region while the unmanned aerial vehicle in the air. Further, if an obstacle such as another flight device is present in the geofence region, there is a risk of collision with the obstacle.

SUMMARY

Aspects of the present invention are to address at least the above mentioned problems and/or disadvantages and to provide at least the advantages described below. Accordingly, an aspect of the present invention is to provide an unmanned aerial vehicle (UAV) and geofence reconfiguration method thereof wherein the unmanned aerial vehicle while in flight compares the geofence region with that of another unmanned aerial vehicle located in the vicinity, and, if the geofence regions overlap each other, to prevent a collision between the two vehicles, resets the geofence region so as to prevent a geofence overlap from occurring.

In accordance with an aspect of the present invention, an unmanned aerial vehicle may include: a flight body; a camera provided on the flight body; a sensor module mounted inside the flight body to sense nearby surroundings; a wireless communication module mounted inside the flight body to wirelessly communicate with an external communication device; a processor mounted inside the flight body and electrically connected with the camera, the sensor module, and the wireless communication module; and a memory electrically connected with the processor. Here, the memory may store instructions that, when the unmanned aerial vehicle (UAV) is in flight, cause the processor to: identify a first geofence region preset in accordance with a current position of the unmanned aerial vehicle; broadcast flight information on a periodic basis; receive flight information from a second unmanned aerial vehicle in the flight; determine whether there is an overlap between the first geofence region and a second geofence region of the second unmanned aerial vehicle; and reset, if there is an overlap between the first geofence region and the second geofence region, the first geofence region so that the first geofence region does not overlap with the second geofence region.

In accordance with another aspect of the present invention, a method of geofence reconfiguration for an unmanned aerial vehicle may include: broadcasting flight information on a periodic basis when the unmanned aerial vehicle starts flying in response to a flight control signal; determining, based on flight information of a second unmanned aerial vehicle received in flight, whether there is an overlap between a first geofence region preset in accordance with the flight position of the unmanned aerial vehicle and a second geofence region of the second unmanned aerial vehicle; and resetting, if there is an overlap between the first geofence region and the second geofence region, the first geofence region so that the first geofence region does not overlap with the second geofence region.

According to the teachings of present invention, unmanned aerial vehicles periodically broadcast flight information and exchange flight information with each other. One unmanned aerial vehicle may compare its geofence region with that of another unmanned aerial vehicle in the vicinity thereof to check an existence of an overlap area between the geofence regions, and, to prevent a collision, change (or reduce) the geofence region so that a geofence overlap does not occur. To this end, the unmanned aerial vehicle can reconfigure or reset its geofence region while in flight. That is, the unmanned aerial vehicle can prevent a collision with another unmanned aerial vehicle in the vicinity or with an additional obstacle in the geofence region by resetting the geofence region while in the air or flight.

DETAILED DESCRIPTION

Figure 1:
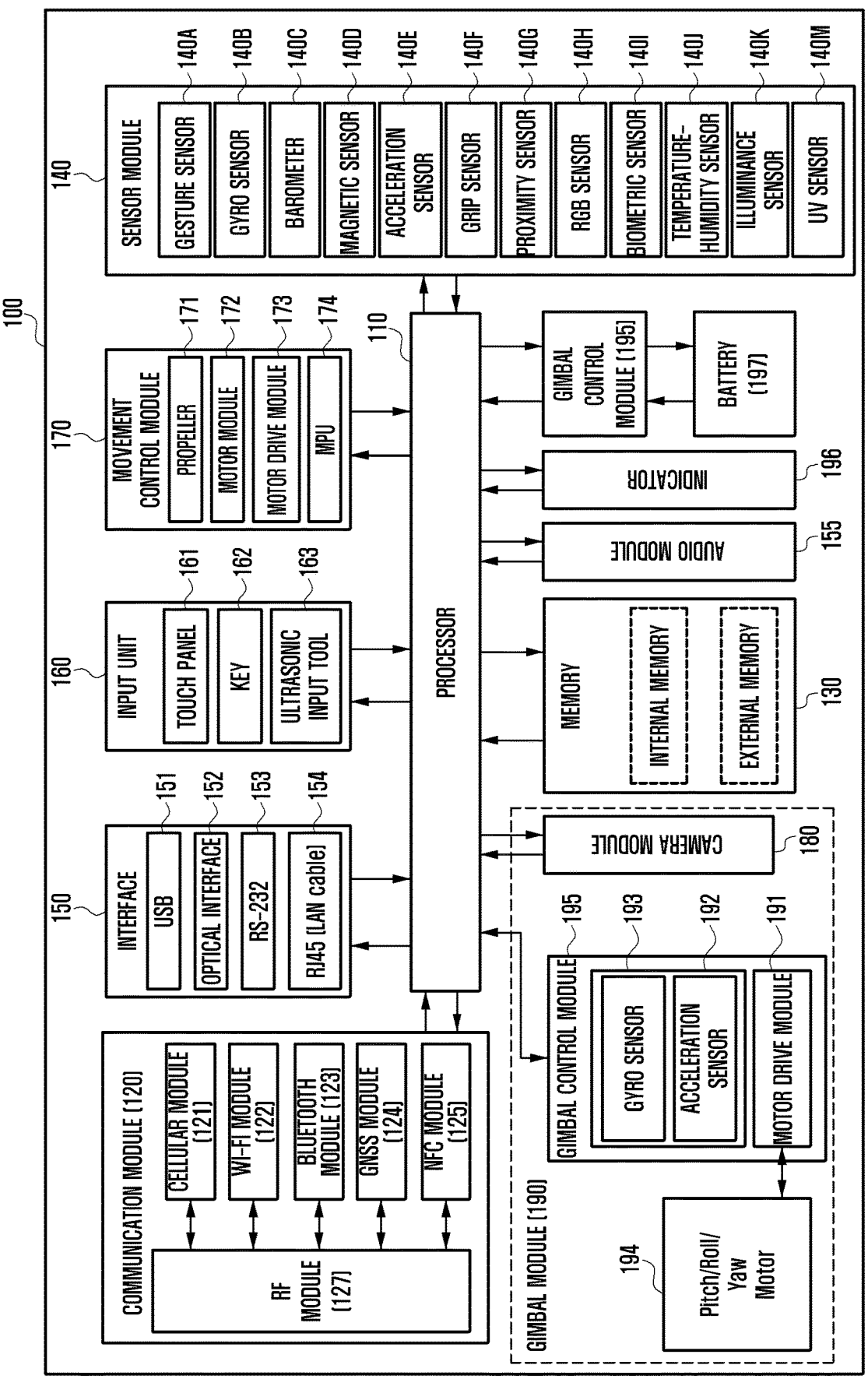
FIG. 1 illustrates the configuration of an electronic device according to an embodiment of the present disclosure.

Hereinafter, various embodiments of the present disclosure will be described with reference to the accompanying drawings. However, it should be understood that the present disclosure is not limited to the specific embodiments described hereinafter, but includes various modifications, equivalents, and/or alternatives of the embodiments of the present disclosure. For simplicity and clarity, similar drawing reference numerals may be used for similar constituent elements. A singular expression may include a plural expression unless specially described.

In the description, the term "A or B" or "at least one of A and/or B" includes all possible combinations of words enumerated together. The terms "first" and "second" may describe various constituent elements, but they do not limit the corresponding constituent elements. For example, the above-described terms do not limit the order and/or importance of the corresponding constituent elements, but may be used to differentiate a constituent element from other constituent elements. When it is described that an (e.g., first) element is "connected" or "coupled" to another (e.g., second) element (e.g., functionally or communicatively), the element may be "directly connected" to the other element or "connected" to the other element through another (e.g., third) element.

In the present disclosure, the term "configured to" may be interchangeably used with, in hardware or software, "suitable to", "capable of", "changed to", "made to", "able to", or "designed to". In certain situations, the expression "device configured to" may mean that the device can do "together with another device or components". For example, the phrase "processor configured (or set) to perform A, B, and C" may mean a dedicated processor (e.g., embedded processor) for performing the corresponding operation, or a general-purpose processor (e.g., central processing unit (CPU) or application processor (AP)) that can perform the corresponding operations. The term "and/or" covers a combination of a plurality of items, or any of the plurality of items.

Various embodiments relate to an unmanned aerial vehicle (UAV) or a drone to which the teachings of present invention may be applicable are described hereinafter.

FIG. 1 illustrates the configuration of an unmanned aerial vehicle according to an embodiment of the present disclosure.

With reference to FIG. 1, the unmanned aerial vehicle 100 (or electronic device) may include at least one processor 110 (e.g. AP), a communication module 120, an interface 150, an input unit 160, a sensor module 140, a memory 130, an audio module 155, an indicator 196, a power management module 198, a battery 197, a camera module 180, and a movement control module 170, and may further include a gimbal module 190.

The processor 110, which may include a filter, a low noise amplifier (LNA) and an antenna, may execute the operating system or application programs to control a plurality of hardware or software components connected thereto and to perform various data processing and operations. The processor 110 may execute the operating system or application programs to generate flight commands for the electronic device. For example, the processor 110 may generate a movement command using data received from the camera module 180, the sensor module 140, or the communication module 120.

The processor 110 can generate a movement command by calculating the relative distance of a detected target object, generate an altitude movement command of the unmanned photographing apparatus from the vertical coordinates of the target object, and generate a horizontal and azimuth command of the unmanned photographing apparatus from the horizontal coordinates of the target object.

The communication module 120 may include, for example, a cellular module 121, a Wi-Fi module 122, a Bluetooth module 123, a GNSS module 124, an NFC module 125, and an RF module 127. In one embodiment, the communication module 120 may receive a control signal from the electronic device and transmit status information and image data information of the unmanned aerial vehicle to another unmanned aerial vehicle. The RF module 127 may transmit and receive communication signals (e.g. RF signals). The RF module 127 may include, for example, a transceiver, a power amplifier module (PAM), and a frequency filter. The GNSS module 124 may output position information (latitude longitude, altitude, GPS speed, GPS heading) of the unmanned aerial vehicle during movement. The position information can be calculated by measuring precise time and distance through the GNSS module 124. The GNSS module 124 can obtain three-dimensional velocity information and accurate time information as well as position information (latitude, longitude, and altitude). In one embodiment, the communication module 120 may be used to transmit information for checking the real-time movement state of the unmanned photographing apparatus to the unmanned aerial vehicle.

The interface 150 may be used to input and output data from and to another unmanned aerial vehicle. For example, the USB interface 151, the optical interface 152, the RS-232 interface 153, and the RJ45 interface 154 may be used to deliver commands or data input from an external device to various components of the unmanned aerial vehicle, or to output commands or data input from various components of the unmanned flight device to the user or other external device.

The input unit 160 may include, for example, a touch panel 161, a key 162, and an ultrasonic input tool. The touch panel 161 may use at least one of capacitive, resistive, infrared, and ultrasonic schemes. The touch panel 161 may further include a control circuit. The key 162 may include, e.g., a physical button, optical key, or key pad. The ultrasonic input tool 163 may be used to identify data corresponding to ultrasonic waves generated by an input tool and sensed through a microphone. The input device 160 may be used to receive a control input for the unmanned aerial vehicle. For example, when the physical power key is pressed, the unmanned aerial vehicle can be powered off.

The sensor module 140 may include one or more of a gesture sensor 140A capable of sensing the motion and/or gesture of a target object, a gyro sensor 140B capable of measuring the angular velocity of an unmanned photographing apparatus in flight, a barometer 140C capable of measuring atmospheric pressure changes and/or the atmospheric pressure, a magnetic sensor (terrestrial magnetism sensor, compass sensor) 140D capable of measuring geomagnetic fields, an acceleration sensor 140E for measuring the acceleration of the unmanned aerial vehicle in flight, a grip sensor 140F, a proximity sensor 140G for measuring the proximity and distance of an object (including an ultrasonic sensor capable of measuring the distance by outputting an ultrasonic wave and measuring the signal reflected from an object), an RGB sensor 140H, an optical flow sensor capable of calculating the position by recognizing the ground topography or pattern, a biometric sensor 140I for user authentication, a temperature-humidity sensor 140J for measuring the temperature and humidity, an illuminance sensor 140K capable of measuring illuminance, and an ultraviolet (UV) sensor 140M capable of measuring ultraviolet rays. In various embodiments, the sensor module 140 may calculate the attitude of the unmanned aerial vehicle. The attitude information of the unmanned aerial vehicle may be shared with the flight control module.

The memory 130 may include an internal memory and an external memory. The memory 130 may store commands or data related to at least one component of the unmanned aerial vehicle. The memory 130 may store software and/or programs. The programs may include a kernel, a middleware, an application programming interface (API), and/or an application program (application).

The audio module 155 can bidirectionally convert between sound signals and electrical signals. The audio module 155 may include a speaker and a microphone to process input or output sound information.

The indicator 196 may indicate a particular state (e.g. operation state or charge state) of the unmanned aerial vehicle or a part thereof (e.g. processor). The indicator 196 may indicate the flight state and operating mode of the unmanned aerial vehicle.

The power management module 198 may manage the power of the unmanned aerial vehicle. In one embodiment, the power management module 198 may include a power management integrated circuit (PMIC), a charger IC, and a battery 197 or fuel gauge. The PMIC may use a wired and/or wireless charging scheme. The wireless charging scheme may employ, e.g., a magnetic resonance scheme, a magnetic induction scheme, or an electromagnetic wave based scheme, and may further employ a supplementary circuit for wireless charging, such as a coil loop, a resonance circuit, or a rectifier. The battery gauge may measure, e.g., the remaining power, voltage, current, or temperature of the battery while the battery is being charged.

The battery 197 may include, e.g., rechargeable cells and/or solar cells.

The camera module 180 may be included in the unmanned aerial vehicle, or in the gimbal module 190 if the unmanned aerial vehicle includes gimbals. The camera module 180 may include a lens, an image sensor, an image processor, and a camera controller. The camera controller may adjust the composition of the target object and/or the camera angle (shooting angle) by adjusting the angle of the camera lens vertically and horizontally on the basis of composition information and/or camera control information output from the processor 110. The image sensor may include a row driver, a pixel array, a column driver, and the like. The image processor may include an image preprocessor, an image postprocessor, a still image codec, a video codec, and the like. The image processor may be included in the processor 110. The camera controller may control focusing and tracking.

The camera module 180 can perform a photographing operation in shooting mode. The camera module 180 may be affected by the movement of the unmanned aerial vehicle. The camera module 180 may be placed in the gimbal module 190 to minimize a variation in the photographing operation due to the movement of the unmanned aerial vehicle.

The movement control module 170 may control the attitude and movement of the unmanned aerial vehicle by using the position and attitude information thereof. The movement control module 170 may control the roll, pitch, yaw, and throttle of the unmanned aerial vehicle according to the obtained position and attitude information. The movement control module 170 may control the autonomous flight operation based on the hovering flight operation and autonomous flight commands (distance movement, altitude movement, horizontal movement and azimuth commands) provided by the processor, or control the flight operation according to the user input commands. For example, the movement module may be a quadcopter, and the movement control module 170 may include one or more microprocessor units (MPUs) 174 for movement control, a motor drive module 173, a motor module 172, and propellers 171. The MPUs 174 may output control data for rotating the propellers 171 in accordance with the flight operation control. The motor drive module 173 may convert the motor control data corresponding to the output of the MPUs 174 into a drive signal and output the drive signal. Each motor may control the rotation of the corresponding propeller 171 based on the corresponding drive signal of the motor driving module 173.

The gimbal module 190 may include, for example, a gimbal control module 195, sensors 193 and 192, a motor drive module 191, and a motor 194. The camera module 180 may be included in the gimbal module 190.

The gimbal module 190 may generate compensation data according to the motion of the unmanned aerial vehicle. The compensation data may be used to control at least a portion of the pitch or roll of the camera module 180. For example, the roll motor and the pitch motor may compensate for the roll and pitch of the camera module 180 according to the movement of the unmanned aerial vehicle. The camera module 180 is mounted on the gimbal module 190, and the gimbal module 190 may offset the movement due to the rotation (e.g. pitch, roll) of the unmanned aerial vehicle (e.g. multicopter) so that the setup of the camera module 180 can be stabilized. The gimbal module 190 allows the camera module 180 to maintain a constant tilt regardless of the motion of the unmanned aerial vehicle, enabling stable image capturing. The gimbal control module 195 may include a sensor module including a gyro sensor 193 and an acceleration sensor 192. The gimbal control module 195 may analyze measurement values of the sensor module including the gyro sensor 193 and the acceleration sensor 192, generate a control signal for the gimbal motor drive module 191, and drive the motor 194 of the gimbal module 190.

Figure 2:
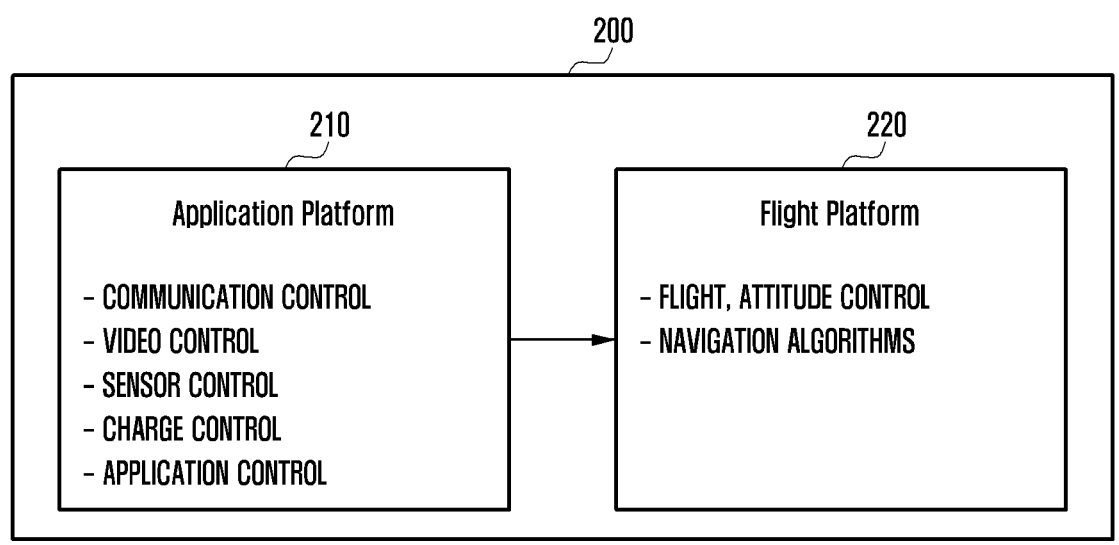
FIG. 2 illustrates the software configuration of an unmanned aerial vehicle according to an embodiment of the present disclosure.

FIG. 2 illustrates the software configuration of the unmanned aerial vehicle according to an embodiment of the present disclosure.

With reference to FIG. 2, the unmanned aerial vehicle 200 may include an application platform 210 and a flight platform 220. The application platform 210 may be used to generate control signals through wireless interactions/operations for driving the unmanned aerial vehicle and providing services. The flight platform 220 may be used to carry out a flight control or operation according to navigation algorithms. Here, the unmanned aerial vehicle 200 may be the unmanned aerial vehicle 100 shown in FIG. 1.

The application platform 210 may perform connectivity control, video control, sensor control, charge control, and operation switching between user applications for the components of the unmanned aerial vehicle. The application platform 210 may be executed by the processor. The flight platform 220 may execute flight, attitude control, and navigation algorithms for the unmanned aerial vehicle. The flight platform 220 may be executed by the processor or the movement control module.

The application platform 210 may transmit a pilot signal to the flight platform 220 while performing communication control, video control, sensor control, or charge control.

In one embodiment, the processor 110 (in FIG. 1) may obtain an image of a target object photographed by the camera module 180 (in FIG. 1). The processor 110 may analyze the obtained image and generate a command for flying the unmanned aerial vehicle 100. For example, the processor 110 may generate information on the size and moving state of the photographed target object, information on the relative distance between the photographing apparatus and the target object, and information on the altitude and azimuth. Based on the obtained information, the processor 110 may generate a "follow" pilot signal for the unmanned aerial vehicle. The flight platform 220 may control the movement control module 170 based on the pilot signal to fly the unmanned flight device (attitude and movement control).

In one embodiment, the processor 110 may measure the position, flight attitude, attitude angular velocity, and acceleration of the unmanned aerial vehicle through a GPS module (e.g. GPS module 124) and a sensor module (e.g. sensor module 140). The output information of the GPS module 124 and the sensor module 140 can be generated at the time of flight and can serve as basic information of the pilot signal for navigation/autopilot of the unmanned aerial vehicle. Information produced by an air pressure sensor capable of measuring the altitude through the air pressure difference caused by the flight of the unmanned aerial vehicle, and information produced by ultrasonic sensors performing precise altitude measurement at low altitudes can also be used as the basic information. In addition, the pilot data signal received from the remote controller, and the battery state information of the unmanned aerial vehicle can be utilized as the basic information of the pilot signal.

The unmanned aerial vehicle can fly using multiple propellers. The propeller may convert the rotational force of the motor into the propulsive force. Depending on the number of rotors (propellers), an unmanned aerial vehicle with four rotors may be referred to as a quadcopter; an unmanned aerial vehicle with six rotors may be referred to as a hexacopter; and an unmanned aerial vehicle with eight rotors may be referred to as an octocopter.

In operation, the unmanned aerial vehicle can control the propeller based on a received pilot signal. The unmanned aerial vehicle may fly according to the two principles of lift and torque. For flight, the unmanned aerial vehicle can rotate half of the propellers clockwise (CW) and rotate the other half counterclockwise (CCW). The three-dimensional coordinates of the unmanned aerial vehicle can be determined by pitch (Y), roll (X), and yaw (Z). The unmanned aerial vehicle can fly by tilting back and forth and/or tilting left and right. When the unmanned aerial vehicle is tilted, the direction of the flow of air generated by the propeller module (rotor) may change. For example, when the unmanned aerial vehicle is leaning forward, the air can flow not only up and down but also slightly backward. As the air layer is pushed backward, the unmanned aerial vehicle can advance forward according to the action and reaction law. The way to tilt the unmanned aerial vehicle is to reduce the speed of the front propeller in the direction and increase the speed of the rear propeller. Since this scheme is commonly applicable to all directions, the unmanned aerial vehicle can be tilted and moved only by adjusting the speed of the motor module (rotor).

The unmanned aerial vehicle may receive a pilot signal generated by the application platform 210 via the flight platform 220 and control the motor module to thereby perform flight control according to the attitude and movement based on pitch (Y), roll (X), and yaw (Z).

According to an embodiment of the present invention, the processor (processor 110 of FIG. 1) of the unmanned aerial vehicle may identify the first geofence region set in advance corresponding to a current position of the unmanned aerial vehicle, and periodically broadcast the flight information while in flight. Note that the flight geofence region may include relative areas based on the user locations and absolute areas excluding a flight restriction zone (e.g. power plant, prison, or military camp) set according to flight regulations. Upon determining that an overlap exists between the first geofence region and a second geofence region of a second unmanned aerial vehicle on the basis of flight information of the second unmanned aerial vehicle received while in flight, the processor may reset the range of the first geofence region so that the first geofence region do not overlap the second geofence region. Here, the processor may reset the first geofence region based on an adjustment value for at least one of the radial distance and the flight altitude of the first geofence region.

In one embodiment, when flight information is received through the communication module 120 from a second unmanned aerial vehicle positioned within a preset distance from the first geofence area, the processor 110 of the unmanned aerial vehicle may determine an adjustment value for at least one of the radial distance and the flight altitude of the first geofence region so that that the first geofence region do not overlap the second geofence region of the second unmanned aerial vehicle, and change the range of the first geofence region based on the determined adjustment value.

In one embodiment, the processor 110 of the unmanned aerial vehicle may receive flight information through the communication module 120 from a second unmanned aerial vehicle positioned within a preset distance from the first geofence area. If an overlap exists between the first geofence region and the second geofence region of the second unmanned aerial vehicle, the processor 110 may negotiate with the second unmanned aerial vehicle through wireless communication to determine adjustment values for changing at least one of the first geofence region and the second geofence region, and reset or readjust the range of the first geofence region based on the determine adjustment values.

In one embodiment, if the overlap portion between the first geofence region and the second geofence region cannot be determined, the processor 110 of the unmanned aerial vehicle may transmit the flight information of the unmanned aerial vehicle to a geofence server, receive an adjustment value for at least one of the radial distance and the flight altitude of the first geofence region from the geofence server, and reset the first geofence region based on the received adjustment value.

In one embodiment, if the overlap portion between the first geofence region and the second geofence region cannot be determined, the processor 110 of the unmanned aerial vehicle may receive an adjustment value for at least one of the radial distance and the flight altitude of the first geofence region from an electronic device producing control signals for controlling the unmanned aerial vehicle, and reset the first geofence region based on the received adjustment value.

In one embodiment, when configuration information indicating placement of a range limitation in the first geophone area is received from the electronic device producing control signals for controlling the unmanned aerial vehicle, the processor 110 of the unmanned aerial vehicle may determine a specific position corresponding to the configuration information inside the first geofence region and reset the first geofence region by designating a zone derived from the determined position as a flight restriction zone.

In one embodiment, if the flight altitude of the unmanned aerial vehicle is equal to that of the second unmanned aerial vehicle, the processor 110 of the unmanned aerial vehicle may reset the first geofence region by changing the flight altitude of the unmanned aerial vehicle so that the unmanned aerial vehicle and the second unmanned aerial vehicle can fly at different altitudes.

In one embodiment, to notify the user of a change in the first geofence region, when the first geofence region is reset, the processor 110 of the unmanned aerial vehicle may transmit the changed first geofence region information to an electronic device (e.g. control equipment) controlling the unmanned aerial vehicle.

Figure 3:
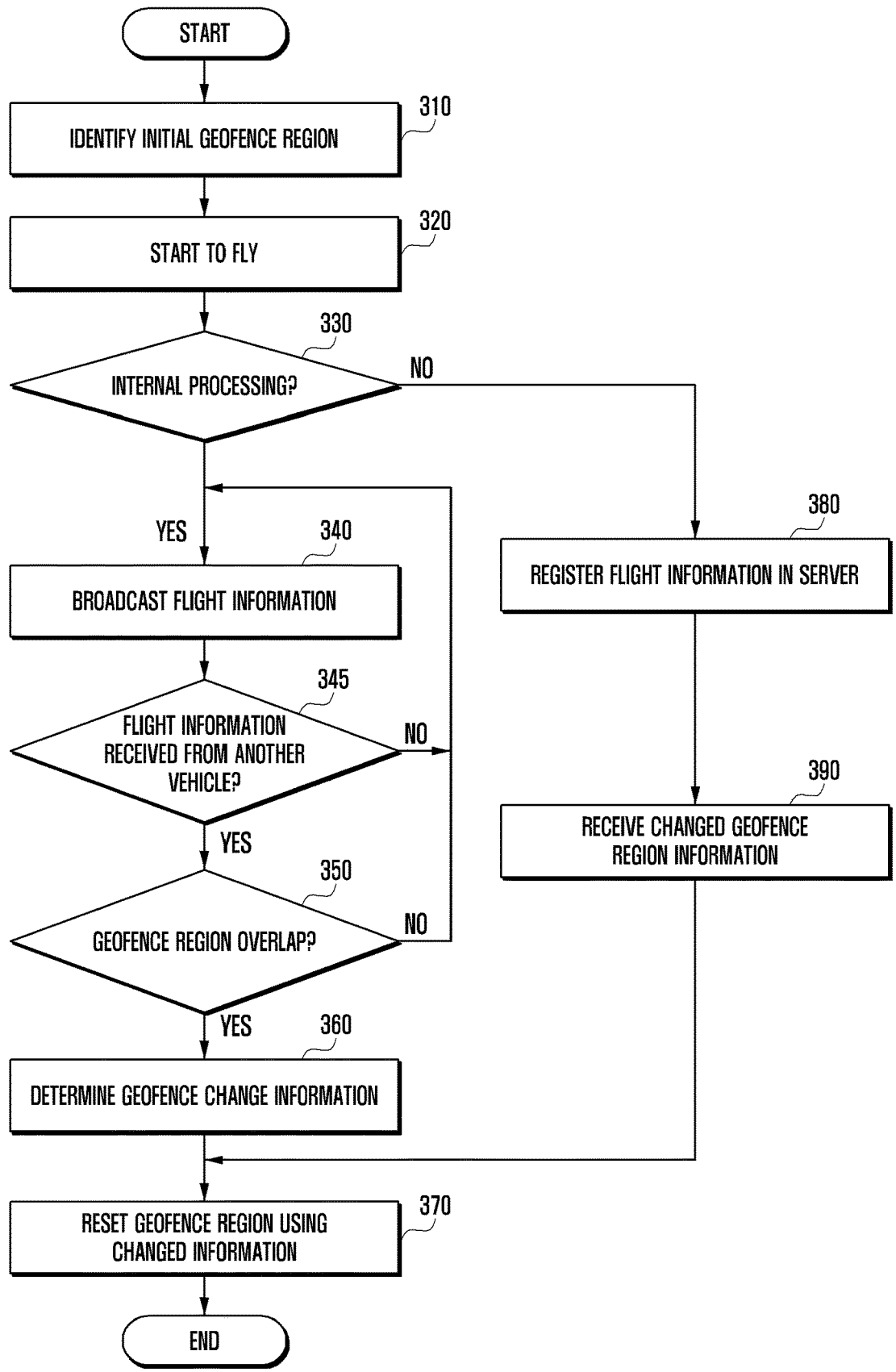
FIG. 3 is a flowchart of a geofence reconfiguration method of the unmanned aerial vehicle according to an embodiment of the present disclosure.

FIG. 3 is a flowchart of a geofence reconfiguration method of the unmanned aerial vehicle according to an embodiment of the present disclosure.

With reference to FIG. 3, at operation 310, prior to the flight, the unmanned aerial vehicle may determine an initial flight geofence region (e.g. first region) with respect to its current position based on a predefined scheme. That is, the flight geofence region refers to a virtual area set based on GPS and map information in which unmanned aerial vehicles are allowed to fly. The operations in FIG. 3 may be controlled by the processor of the unmanned aerial vehicle.

The flight geofence region may include relative areas based on the user locations and absolute areas excluding a flight restriction zone (e.g. power plant, prison, or military camp) set according to flight regulations. The unmanned aerial vehicle can also determine the flight geofence region selectively according to a user input by setting a flight area on a map. Moreover, the initial flight geofence region may be configured in various existing ways such as setting a distance relative to the user, setting a distance based on RF signaling, setting an area on the map, and setting an area of the geo fence according to a user input.

At operation 320, the flight of an unmanned aerial vehicle can be initiated in response to a flight command. Here, the flight command may be received from an electronic device (e.g. radio controller or smart device) wirelessly connected with the unmanned aerial vehicle. The unmanned aerial vehicle is allowed to fly within the geofence region, but when the unmanned aerial vehicle leaves the geofence region, it may be forced to stop flying or may make a detour so as not to leave the geofence region.

In one embodiment, at operation 330, the unmanned aerial vehicle may determine whether geofence reconfiguration can be performed through internal processing. Alternatively, operation 330 may be skipped. If geofence reconfiguration can be performed through internal processing, operations 380 and 390 may also be skipped.

For example, if the unmanned aerial vehicle has its own internal algorithm for determining whether an overlap exists between flight geofence regions, it may be determined that geofence reconfiguration can be performed through internal processing.

In another embodiment, if the unmanned aerial vehicle does not have its own internal algorithm for determining whether an overlap exists between flight geofence regions, operations 380 and 390 with an aid of a server may be performed.

Upon determining that geofence reconfiguration can be performed through internal processing at operation 330, the procedure proceeds to operation 340 at which the unmanned aerial vehicle may broadcast information regarding the flight position and the flight geofence region while in flight.

In another embodiment, operation 340 may be performed between operation 320 and operation 330.

For example, as a transmitter side operation, the unmanned aerial vehicle may broadcast its flight information regarding the flight position, flight direction, flight velocity, and flight geofence region set corresponding to the position at regular intervals through the BLE module.

As a receiver side operation, the unmanned aerial vehicle may receive flight information broadcast by a nearby second unmanned aerial vehicle through the BLE module or wireless communication module.

In one embodiment, the unmanned aerial vehicle in flight may measure position information in real time based on GPS information. Alternatively, the unmanned aerial vehicle may measure the motion vector due to flight with respect to the start point of flight by using sensing information obtained through the sensor module. The motion vector may be data including at least one of three-dimensional coordinates such as the x, y, and z values or roll ($\Phi$), pitch ($\Psi$), and yaw ($\theta$) values. Here, the roll value may indicate the degree of rotation about the x-axis (forward/backward direction of the aerial vehicle), the pitch value may indicate the degree of rotation about the y-axis (left/right direction of the aerial vehicle), and the yaw value may indicate the degree of rotation about the z-axis (vertical direction of the aerial vehicle). The z value may indicate the altitude of the flying unmanned aerial vehicle from the ground.

At operation 345, the unmanned aerial vehicle may determine whether flight information is received from at least one second unmanned aerial vehicle. If flight information is received from at least one second unmanned aerial vehicle, at operation 350, the unmanned aerial vehicle may determine whether an overlap exists between the geofence regions of the unmanned aerial vehicles.

In one embodiment, the unmanned aerial vehicle may identify the geofence region with a first radius from the position thereof (first geofence region), identify a geofence region with a second radius from the position of the second unmanned aerial vehicle (second geofence region configured by the second unmanned aerial vehicle), and compare the first geofence region with the second geofence region based on the parameters of respective vehicle geofence to determine whether the first geofence region overlaps the second geofence region.

If flight information is not received from at least one second unmanned aerial vehicle or there is no overlap between the geofence regions, the procedure returns to operation 340 at which the unmanned aerial vehicle may broadcast its flight information at regular intervals.

Upon determining that an overlap exists between the geofence regions, at operation 360, to prevent a collision with the second unmanned aerial vehicle, the unmanned aerial vehicle may determine to change the radius range of the first geofence region so that the first geofence region does not overlap with the second geofence region.

The unmanned aerial vehicle can calculate an adjustment value for changing its own geofence region (first geofence region). The adjustment value may be a value for changing at least one of the radial distance and the altitude of the geofence region.

At operation 370, the unmanned aerial vehicle may reconfigure the initial geofence region (first geofence region) by using the adjustment value in consideration of the geofence region of the second unmanned aerial vehicle (second geofence region).

For example, the unmanned aerial vehicle may reduce the first radius to decrease the first geofence region or may change the flight altitude so that it can fly at the changed altitude.

Upon determining that geofence reconfiguration cannot be performed through internal processing at operation 330, the procedure proceeds to operation 380 at which the unmanned aerial vehicle may register its flight information in a geofence server through the wireless communication module.

In one embodiment, the unmanned aerial vehicle may provide its flight information to a control equipment connected therewith through short-range communication (e.g. electronic device or wireless control device of the user). The control equipment may register the flight information provided by the unmanned aerial vehicle to the geofence server. The geofence server may collect flight information from unmanned aerial vehicles, determine whether there is an overlap between geofence regions on the basis of flight information of the registered unmanned aerial vehicles, and determine to reconfigure a specific geofence region if necessary. The geofence server may provide an adjustment value for geofence reconfiguration to an unmanned aerial vehicle whose geofence region is to be reset or reconfigured.

At operation 390, the unmanned aerial vehicle may receive geofence reconfiguration information from the geofence server. Then, at operation 370, the unmanned aerial vehicle may reset the initial geofence region (first geofence region) by using the received geofence reconfiguration information.

Figure 4A:
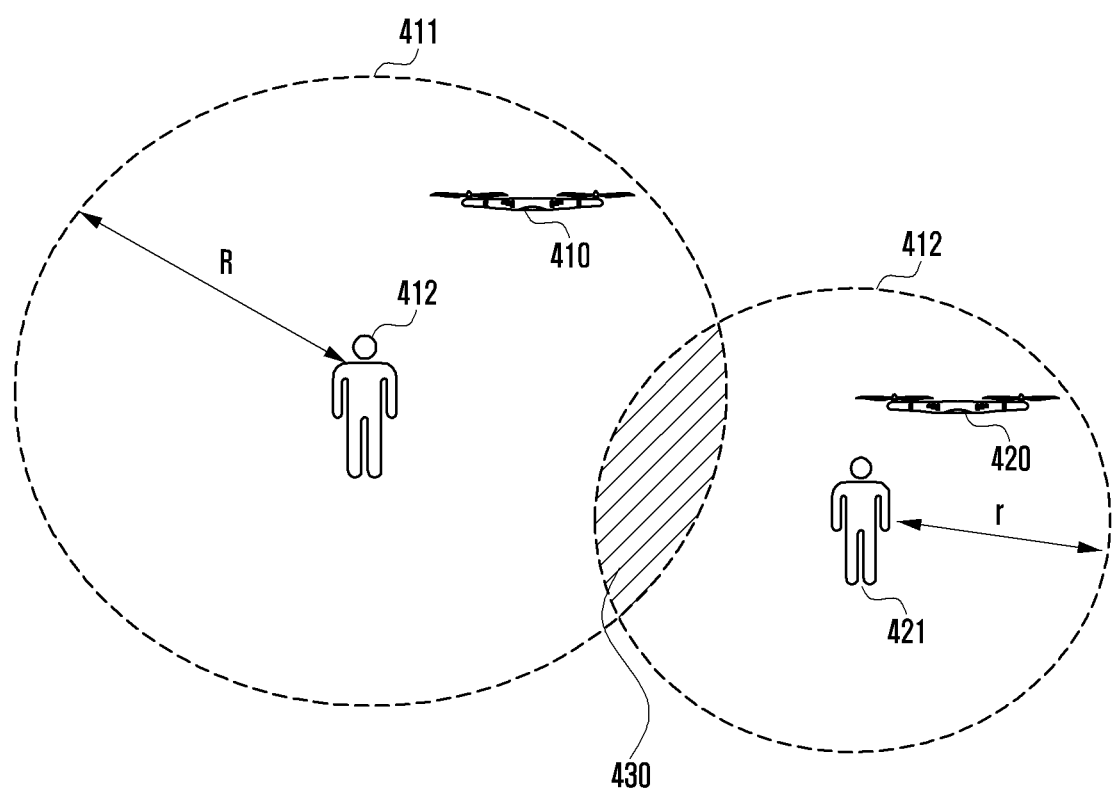
FIG. 4A and FIG. 4B illustrate a comparison between geofence regions of unmanned aerial vehicles according to an embodiment of the present disclosure.
Figure 4B:
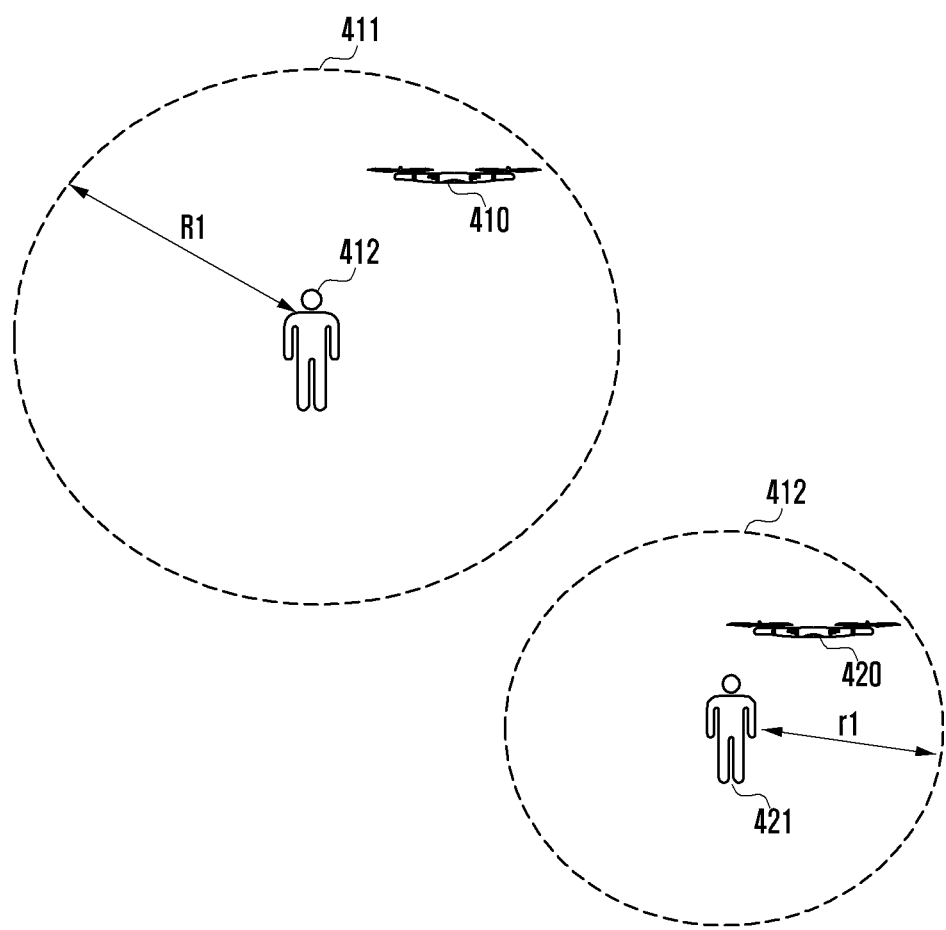

FIGS. 4A and 4B illustrates a comparison between geofence regions of unmanned aerial vehicles according to an embodiment of the present disclosure.

FIG. 4A shows the initial geofence regions set according to preset options before the unmanned aerial vehicles start to fly, and FIG. 4B shows the geofence regions reconfigured to prevent a collision between the unmanned aerial vehicles in flight.

As shown in FIG. 4A, the first unmanned aerial vehicle 410 operated by the first user 410 and the second unmanned aerial vehicle 420 operated by the second user 421 can fly in adjacent areas. The geofence region 411 of the first unmanned aerial vehicle 410 may have a radius R and the geofence region 421 of the second unmanned aerial vehicle 420 may have a radius r. Although the geofence region is represented in a two-dimensional circular shape, it may be understood that the geofence region is formed in the shape of a three-dimensional sphere. The circular shape is shown for the purpose of illustration only, and the geofence region can be set in various shapes according to the setting option.

Each of the first unmanned aerial vehicle 410 and the second unmanned aerial vehicle 420 may broadcast its flight information and may obtain flight information from the other unmanned aerial vehicle in flight within a preset distance. Here, the preset distance may be, but not limited to, a distance at which one unmanned aerial vehicle can communicate with another unmanned aerial vehicle.

For example, when the first unmanned aerial vehicle 410 in flight obtains flight information from the second unmanned aerial vehicle 420, the first unmanned aerial vehicle 410 may determine whether the geofence region 411 of the first unmanned aerial vehicle 410 overlaps the geofence region 421 of the second unmanned aerial vehicle 420. Here, the overlap region 430 between the geofence region 411 of the first unmanned aerial vehicle 410 and the geofence region 421 of the second unmanned aerial vehicle 420 may be an area where an in-flight collision may occur.

As there exists a geofence overlap like the region 430, each of the first unmanned aerial vehicle 410 and the second unmanned aerial vehicle 420 may reconfigure its own geofence region so that no geofence overlap occurs.

For example, as shown in FIG. 4B, the first unmanned aerial vehicle 410 may reset its geofence region by reducing the radius from R to R1. The second unmanned aerial vehicle 420 may also reset its geofence region by reducing the radius from r to r1. As described above, the first unmanned aerial vehicle 410 and the second unmanned aerial vehicle 420 can change their geofence regions so that a region like the region 430 of FIG. 4A is not generated, thereby preventing an in-flight collision that may occur in the overlap zone between geofence regions.

Figure 5:
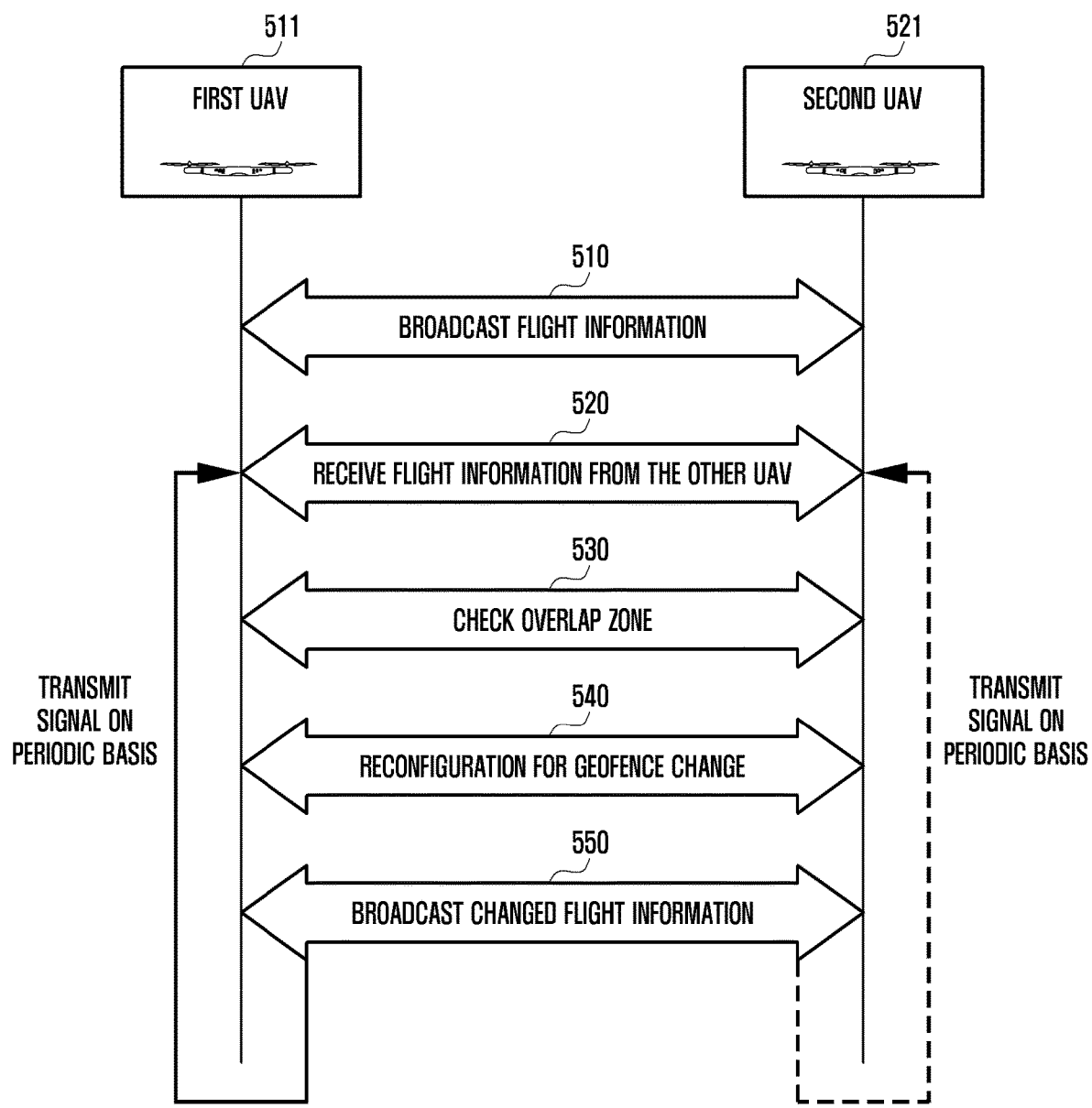
FIG. 5 is a sequence diagram illustrating a geofence reconfiguration method of unmanned aerial vehicles according to an embodiment of the present disclosure.

FIG. 5 is a sequence diagram illustrating a geofence reconfiguration method of unmanned aerial vehicles according to an embodiment of the present disclosure.

In FIG. 5, the unmanned aerial vehicle in flight may communicate with another unmanned aerial vehicle in flight at close range, determine whether a geofence overlap is present, and reconfigure the geofence region so that a geofence overlap is not present.

Each of the first unmanned aerial vehicle 511 and the second unmanned aerial vehicle 521 may be in flight.

At operation 510, each of the first unmanned aerial vehicle 511 and the second unmanned aerial vehicle 521 may broadcast its own flight information.

At operation 520, each of the first unmanned aerial vehicle 511 and the second unmanned aerial vehicle 521 may obtain flight information broadcast by the other in the vicinity.

At operation 530, each of the first unmanned aerial vehicle 511 and the second unmanned aerial vehicle 521 may compare its own flight information with the flight information obtained from the other to determine whether there is an overlap between geofence regions. Here, each of the first unmanned aerial vehicle 511 and the second unmanned aerial vehicle 521 can independently determine whether there is an overlap between geofence regions by using a pre-stored measurement algorithm.

At operation 540, each of the first unmanned aerial vehicle 511 and the second unmanned aerial vehicle 521 may reconfigure its own geofence region so that a geofence overlap does not occur. For example, each of the first unmanned aerial vehicle 511 and the second unmanned aerial vehicle 521 may independently reconfigure its own geofence region by reducing the range of the geofence region, changing the shape of the geofence region, or changing the flight altitude.

At operation 550, each of the first unmanned aerial vehicle 511 and the second unmanned aerial vehicle 521 may store the updated geofence information and broadcast flight information containing the updated geofence information.

Thereafter, each of the first unmanned aerial vehicle 511 and the second unmanned aerial vehicle 521 may broadcast its flight information on a periodic basis, and may repeat operations 520 to 550 while in flight.

As described above, the unmanned aerial vehicle according to an embodiment of the present invention may obtain flight information from another unmanned aerial vehicle in flight at close range, determine whether a geofence overlap is present, and reconfigure the geofence region while in flight so that a geofence overlap does not occur. Thereby, it is possible to prevent an in-flight collision that may occur in the overlap zone between geofence regions.

Figure 6:
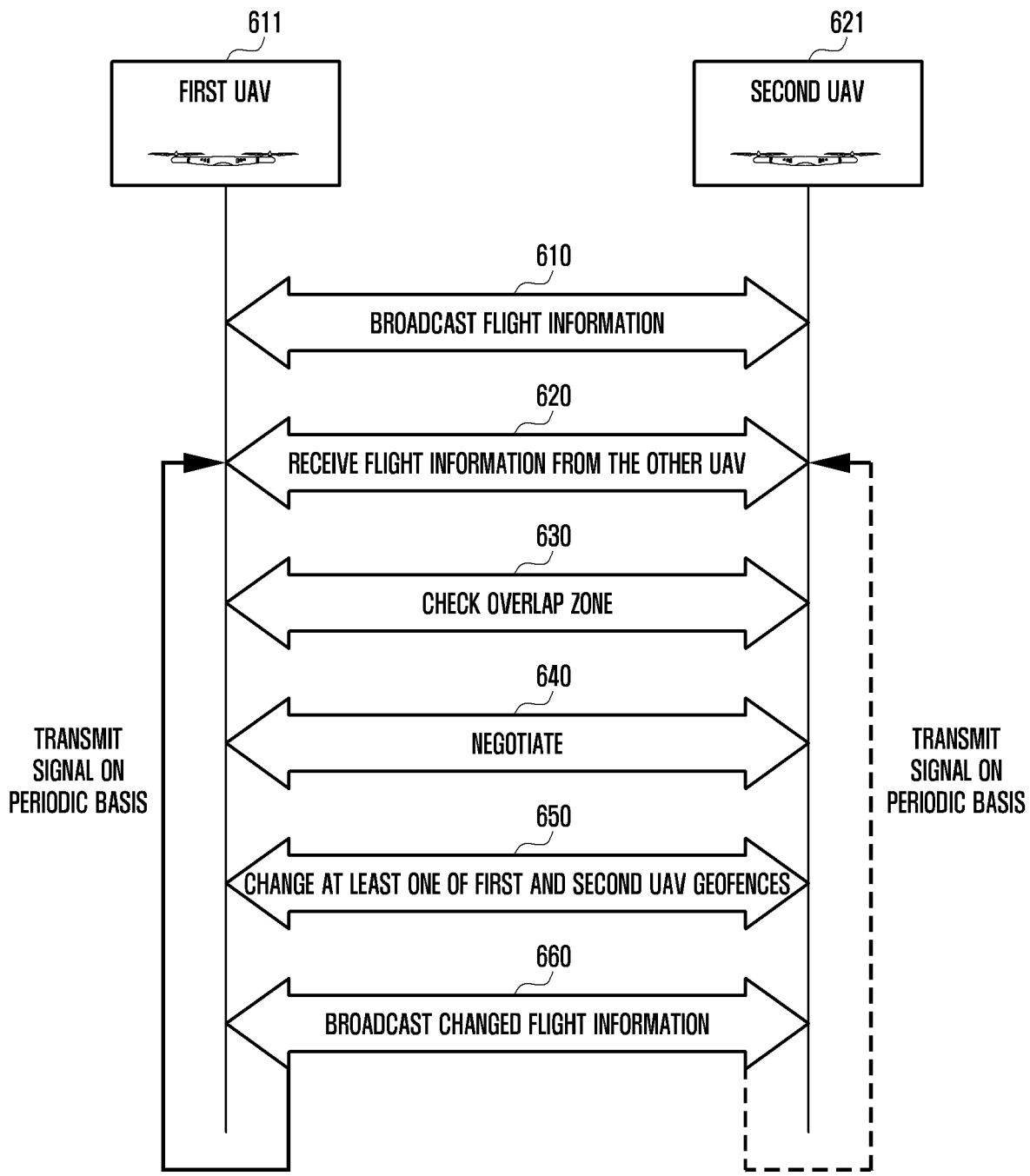
FIG. 6 is a sequence diagram illustrating a geofence reconfiguration method of unmanned aerial vehicles according to an embodiment of the present disclosure.

FIG. 6 is a sequence diagram illustrating a geofence reconfiguration method of unmanned aerial vehicles according to an embodiment of the present disclosure.

In FIG. 6, the unmanned aerial vehicle may determine whether to reconfigure the geofence region through negotiations with another unmanned aerial vehicle flying in the vicinity.

Each of the first unmanned aerial vehicle 611 and the second unmanned aerial vehicle 621 may be in flight.

At operation 610, each of the first unmanned aerial vehicle 611 and the second unmanned aerial vehicle 621 may broadcast its own flight information on a periodic basis. At operation 620, each of the first unmanned aerial vehicle 611 and the second unmanned aerial vehicle 621 may obtain flight information broadcast by the other in the vicinity. At operation 630, each of the first unmanned aerial vehicle 611 and the second unmanned aerial vehicle 621 may compare its own flight information with the flight information obtained from the other to determine whether there is an overlap between geofence regions. Here, each of the first unmanned aerial vehicle 611 and the second unmanned aerial vehicle 621 can independently determine whether there is an overlap between geofence regions by using a pre-stored measurement algorithm.

At operation 640, the first unmanned aerial vehicle 611 and the second unmanned aerial vehicle 621 may perform a negotiation process for changing the geofence regions through wireless communication.

For example, the negotiation process of the first unmanned aerial vehicle 611 and the second unmanned aerial vehicle 621 may include transmitting a range request for changing the geofence region and determining adjustment values for the parameters such as velocity and altitude in respond to the request. Here, the adjustment values may include at least one value for the altitude and the radial distance. The adjustment values may be applied to one or both of the first unmanned aerial vehicle 611 and the second unmanned aerial vehicle 621.

In one embodiment, during the negotiation, one of the first unmanned aerial vehicle 611 and the second unmanned aerial vehicle 621 may notify the adjustment value for the geofence region to the other unmanned aerial vehicle and change the geofence region depending on the acceptance response.

At operation 650, the first unmanned aerial vehicle 611 and the second unmanned aerial vehicle 621 may reconfigure one of the geofence regions so that a geofence overlap does not occur.

At operation 660, each of the first unmanned aerial vehicle 611 and the second unmanned aerial vehicle 621 may store the updated geofence information and broadcast flight information containing the updated geofence information. Thereafter, each of the first unmanned aerial vehicle 611 and the second unmanned aerial vehicle 621 may broadcast its flight information on a periodic basis, and may repeat operations 620 to 650.

Figure 7:
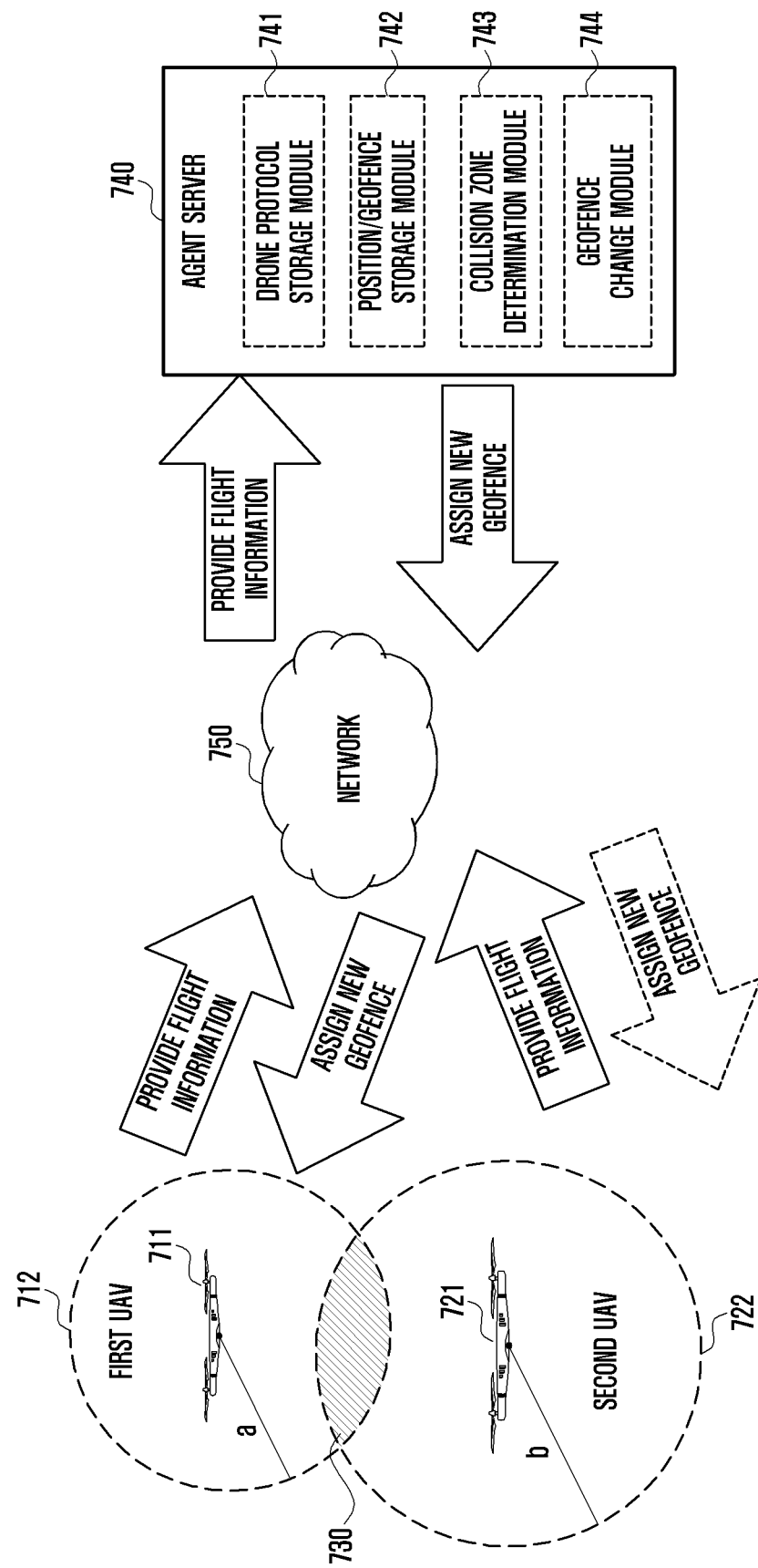
FIG. 7 depicts geofence reconfiguration of unmanned aerial vehicles according to an embodiment of the present disclosure.

FIG. 7 depicts geofence reconfiguration of unmanned aerial vehicles according to an embodiment of the present disclosure.

In FIG. 7, the unmanned aerial vehicle according to an embodiment of the present invention may communicate with a geofence support server while in flight and reconfigure the geofence region so as to prevent a collision with another unmanned aerial vehicle flying in the vicinity.

Each of the unmanned aerial vehicles 711 and 721 may transmit flight information to the geofence support server 740 via wireless communication to register the flight information at regular intervals from the start of flight. The geofence support server 740 may analyze the registered flight information of the unmanned aerial vehicles to determine whether the geofence regions 712 and 722 overlap each other, assign a new geofence range to the unmanned aerial vehicles whose geofence regions overlap each other, and notify the unmanned aerial vehicles of an adjustment value for the geofence range change. Here, the flight information may include information regarding the flight position, flight direction, flight velocity, and geofence region. The adjustment value may include at least one of the altitude and radial distance of the geofence region to be changed for an unmanned aerial vehicle.

In one embodiment, the geofence support server 740 may include a drone protocol storage module 741, a position/geofence storage module 742, a collision zone determination module 743, and a geofence change module 745.

The drone protocol storage module 741 may store information regarding flight restriction zones, flight policies, and the like. The position/geofence storage module 742 may store flight information received from each unmanned aerial vehicle in flight. The geofence support server 740 can manage individual unmanned aerial vehicles by using identification information of the unmanned aerial vehicles. The collision zone determination module 743 may analyze the stored flight information to classify unmanned aerial vehicles by zone and determine whether an overlap zone 730 exists between geofence regions. The collision zone determination module 743 may transmit information regarding the unmanned aerial vehicles associated with an overlap zone to the geofence change module 744. The geofence change module 744 may analyze the flight information of the unmanned aerial vehicles associated with an overlap zone to identify the flight position, flight velocity, flight altitude and geofence region, and determine an adjustment value for changing the range of geofence regions so that no overlap zone is present. The geofence change module 744 may transmit the determined adjustment value to the corresponding unmanned aerial vehicles.

Finally, the unmanned aerial vehicles 711 and 721 may reconfigure their geofence regions by changing the range of their geofence regions based on the adjustment value received from the geofence support server 740.

Figure 8:
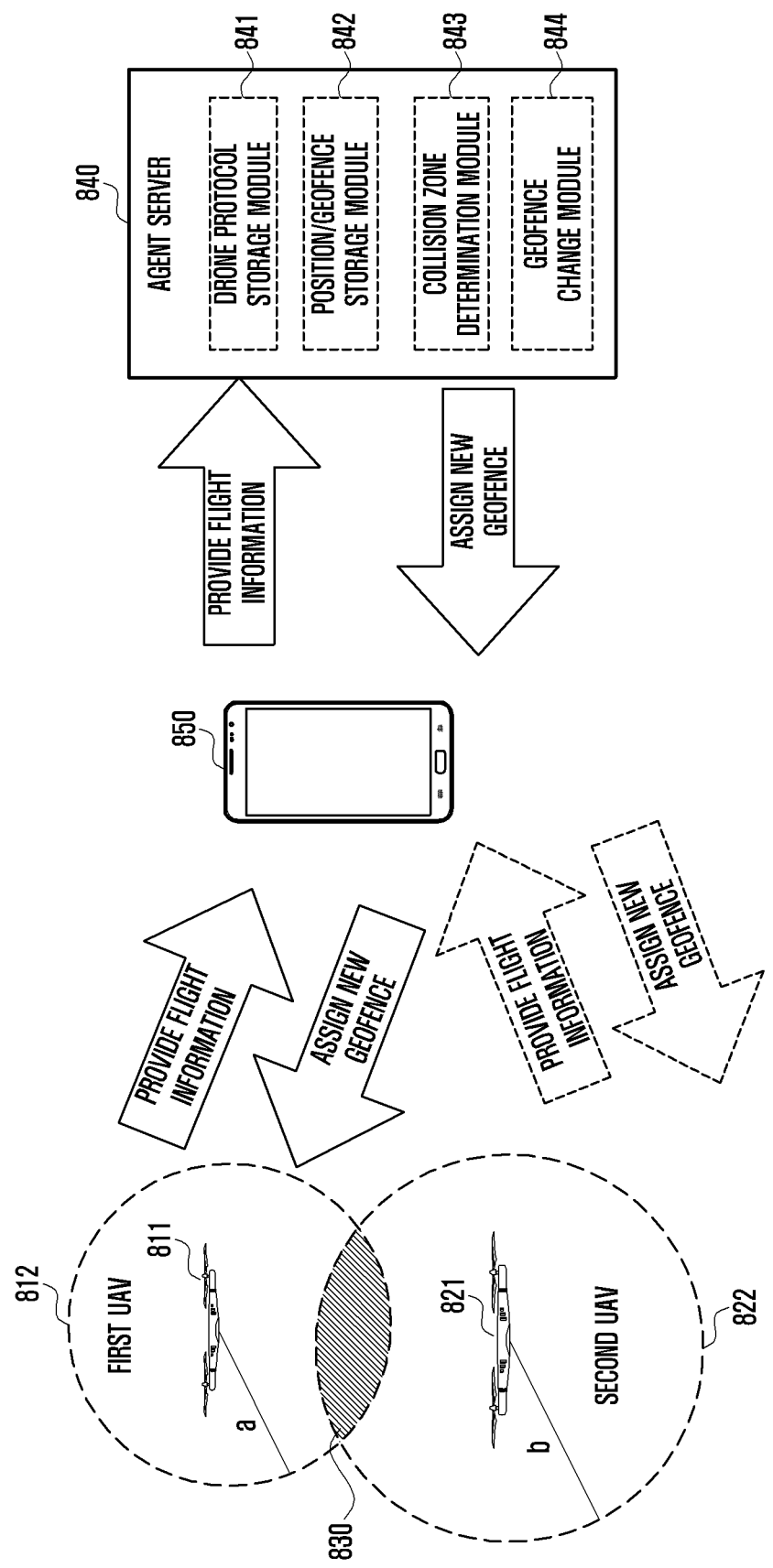
FIG. 8 depicts geofence reconfiguration of unmanned aerial vehicles according to an embodiment of the present disclosure.

FIG. 8 depicts geofence reconfiguration of unmanned aerial vehicles according to an embodiment of the present disclosure.

In FIG. 8, the unmanned aerial vehicle may receive an adjustment value for changing the range of the geofence region from the electronic device 840 controlling unmanned aerial vehicles, and reconfigure its geofence region by changing the range of the geofence region associated with the overlap zone 830 so as to prevent a collision with another unmanned aerial vehicle flying in the vicinity.

For example, the electronic device 840 may provide a control signal to an unmanned aerial vehicle to control the flight of the unmanned aerial vehicle.

The electronic device 840 may obtain flight information broadcast by the unmanned aerial vehicles 811 and 821. Upon receiving flight information from another unmanned aerial vehicle flying in the vicinity of the unmanned flight device controlled directly by the electronic device 840, the electronic device 840 may register flight information of the unmanned aerial vehicle in the geofence support server 840 and receive an adjustment value for changing the geofence region so as to prevent an overlap zone 830 from occurring. Here, the geofence support server 840 may include a drone protocol storage module 841, a position/geofence storage module 842, a collision zone determination module 843, and a geofence change module 845. The geofence support server 840 is the same as the geofence support server 740 of FIG. 7, and thus a detailed description thereof will be omitted.

Thereafter, the electronic device 850 may deliver the adjustment value for changing the geofence region to the unmanned flight device that it controls. Then, the unmanned aerial vehicle may reconfigure the geofence region by changing the range of the geofence region based on the adjustment value received from the electronic device 850.

Figure 9:
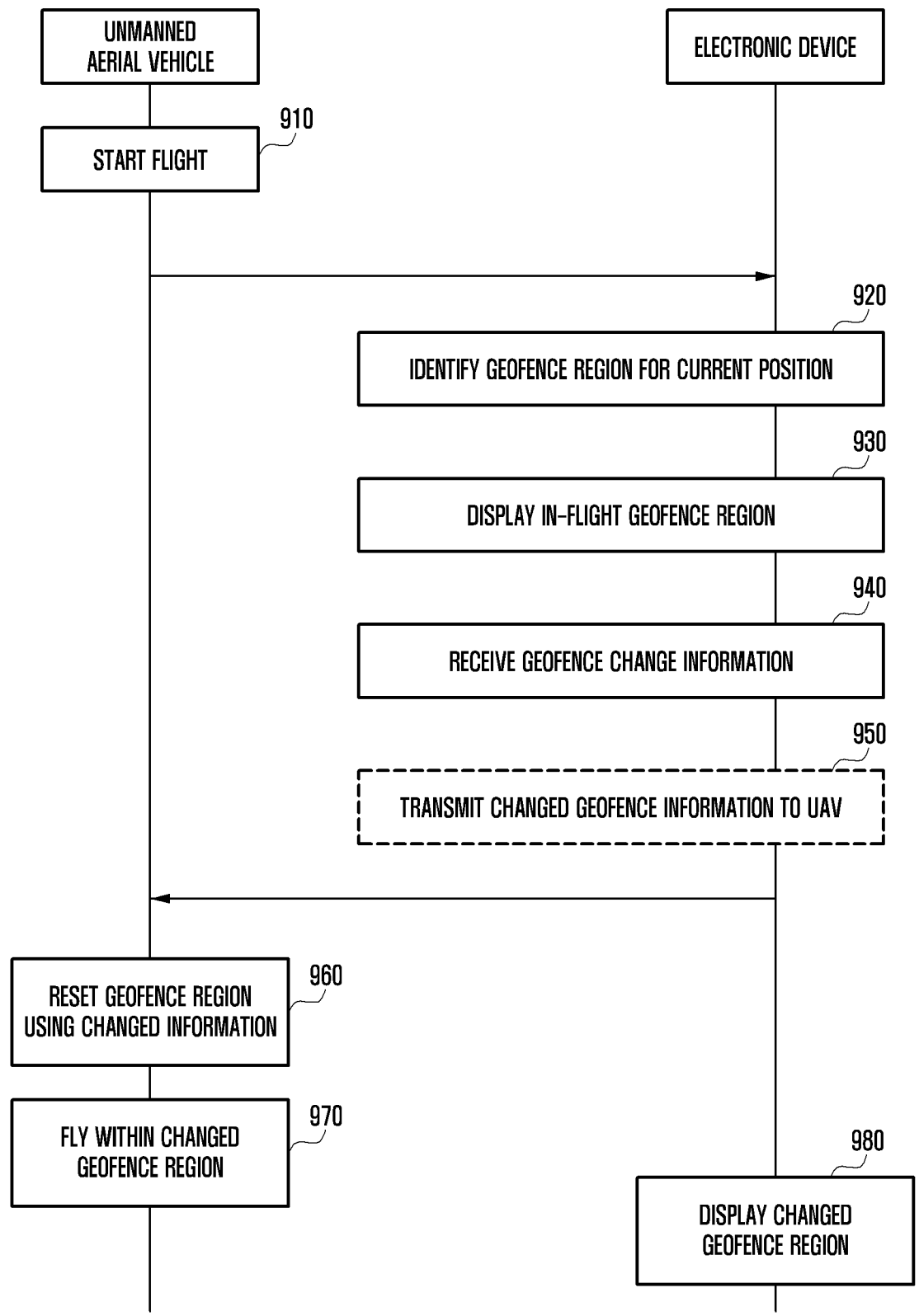
FIG. 9 is a sequence diagram illustrating a geofence reconfiguration method of an unmanned aerial vehicle and an electronic device according to an embodiment of the present disclosure.
Figure 10A:
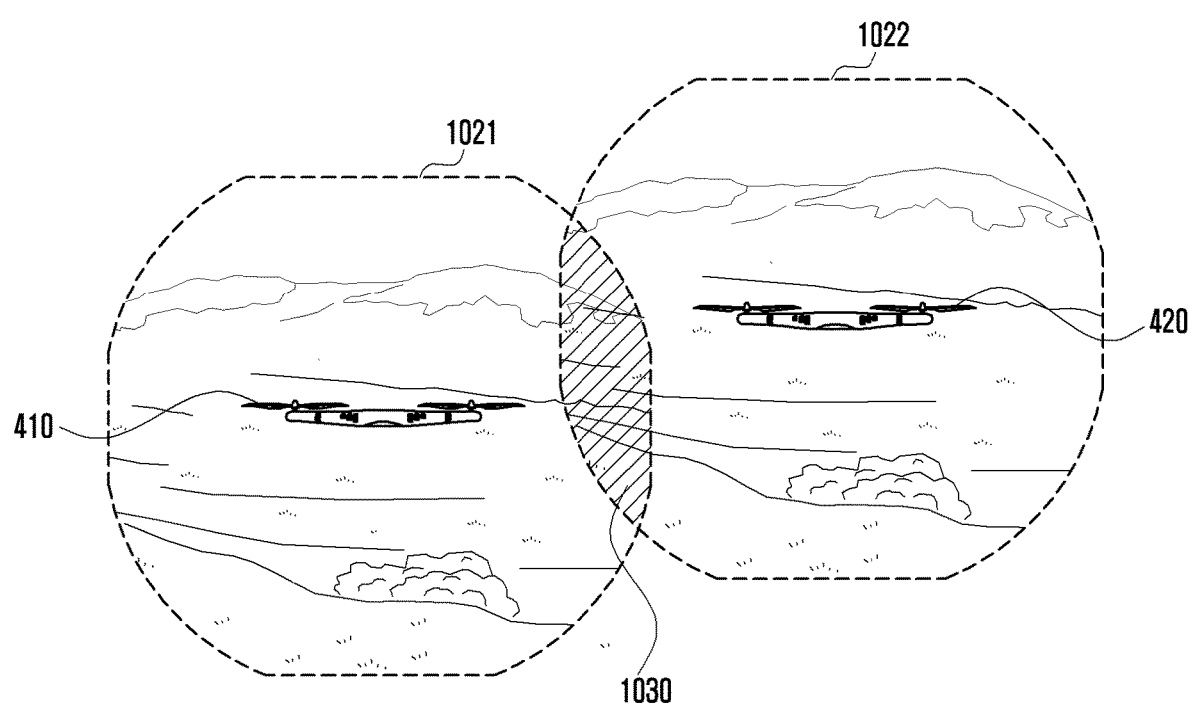
FIG. 10A and FIG. 10B illustrate geofence regions displayed on the screen of the electronic device according to an embodiment of the present disclosure.
Figure 10B:
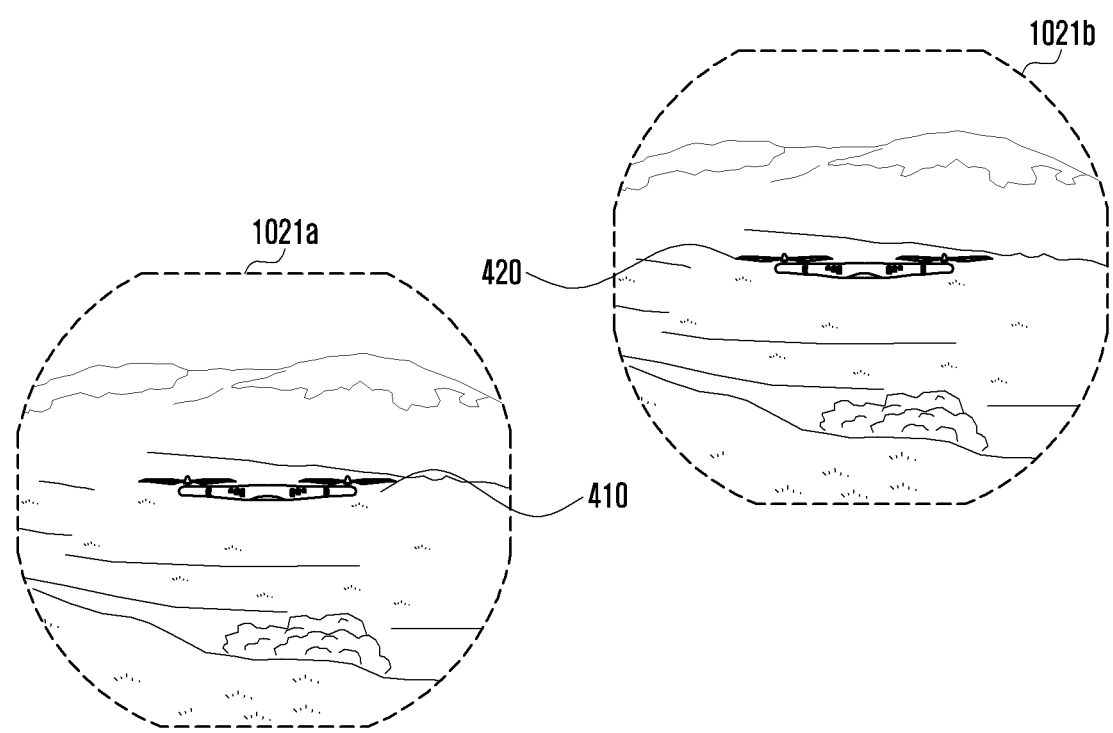

FIG. 9 is a sequence diagram illustrating a geofence reconfiguration method of an unmanned aerial vehicle and an electronic device according to an embodiment of the present disclosure. FIGS. 10A and 10B illustrate geofence regions displayed on the screen of the electronic device according to an embodiment of the present disclosure.

With reference to FIG. 9, in one embodiment, at operation 910, the unmanned aerial vehicle can start flight according to a control signal from the electronic device. Here, the electronic device is connected with the unmanned aerial vehicle through wireless communication and can provide a control signal for controlling the unmanned aerial vehicle. The unmanned aerial vehicle may transmit the geofence region information relative to the current position of the unmanned aerial vehicle to electronic device.

At operation 920, the electronic device may identify the geofence region relative to the current position of the unmanned aerial vehicle. At operation 930, the electronic device may present the in-flight geofence region on the display by using the flight information received from the unmanned aerial vehicle. For example, the electronic device can receive images captured by the unmanned aerial vehicle and display the geofence region on the display on the basis of the images received from the unmanned aerial vehicle or map information. The user can recognize the geofence region for the current position of the unmanned aerial vehicle through the electronic device. For example, FIG. 10A illustrates a GUI screen showing geofence regions displayed on the display of the electronic device. The first unmanned aerial vehicle 1010 and the second unmanned aerial vehicle may fly in the vicinity. Reference numeral 1021 indicates the geofence region of the first unmanned aerial vehicle 1010, and reference numeral 1022 indicates the geofence region of the second unmanned aerial vehicle 1020. Here, there may be an overlap zone 1030 between the geofence regions 1021 and 1022. Because of such an overlap zone, there is a possibility that the first unmanned aerial vehicle 1010 and the second unmanned aerial vehicle 1020 may collide with each other. The unmanned aerial vehicle may transmit information on the changed first geofence region to the electronic device to notify a user of a change in the first geofence region when the first geofence region is changed through a reset.

At operation 940, the electronic device may receive geofence change information due to the overlap zone. For example, the electronic device may receive such geofence change information from the unmanned aerial vehicle or the geofence support server.

At operation 950, the electronic device may transmit the geofence change information to the unmanned aerial vehicle. Operation 950 may be skipped when the adjustment value for changing the geofence region is calculated by an algorithm internal to the unmanned aerial vehicle.

At operation 960, the unmanned flight device may reset the geofence region for avoiding an in-flight collision. At operation 970, the unmanned aerial vehicle may fly within the changed geofence region.

Meanwhile, at operation 980, the electronic device may identify the changed geofence region of the unmanned aerial vehicle and display the changed geofence region on the display. Then, the user can recognize the changed geofence region through the display of the electronic device. For example, FIG. 10A illustrates a GUI screen showing changed geofence regions displayed on the display of the electronic device. Reference numeral 1021a indicates the changed geofence region of the first unmanned aerial vehicle 1010, and reference numeral 1022b indicates the changed geofence region of the second unmanned aerial vehicle 1020. In this case, as the range of the geofence regions of the first and second unmanned aerial vehicles 1010 and 1020 is changed, there is no overlap zone like the overlap zone 1030 between the geofence regions 1021 and 1022 shown in FIG. 10A. That is, since there is no overlap zone, the first and second unmanned aerial vehicles 1010 and 1020 fly within the changed geofence regions 1021a and 1022b, respectively, so that the first and second unmanned aerial vehicles 1010 and 1020 can avoid an in-flight collision with each other.

Figure 11:
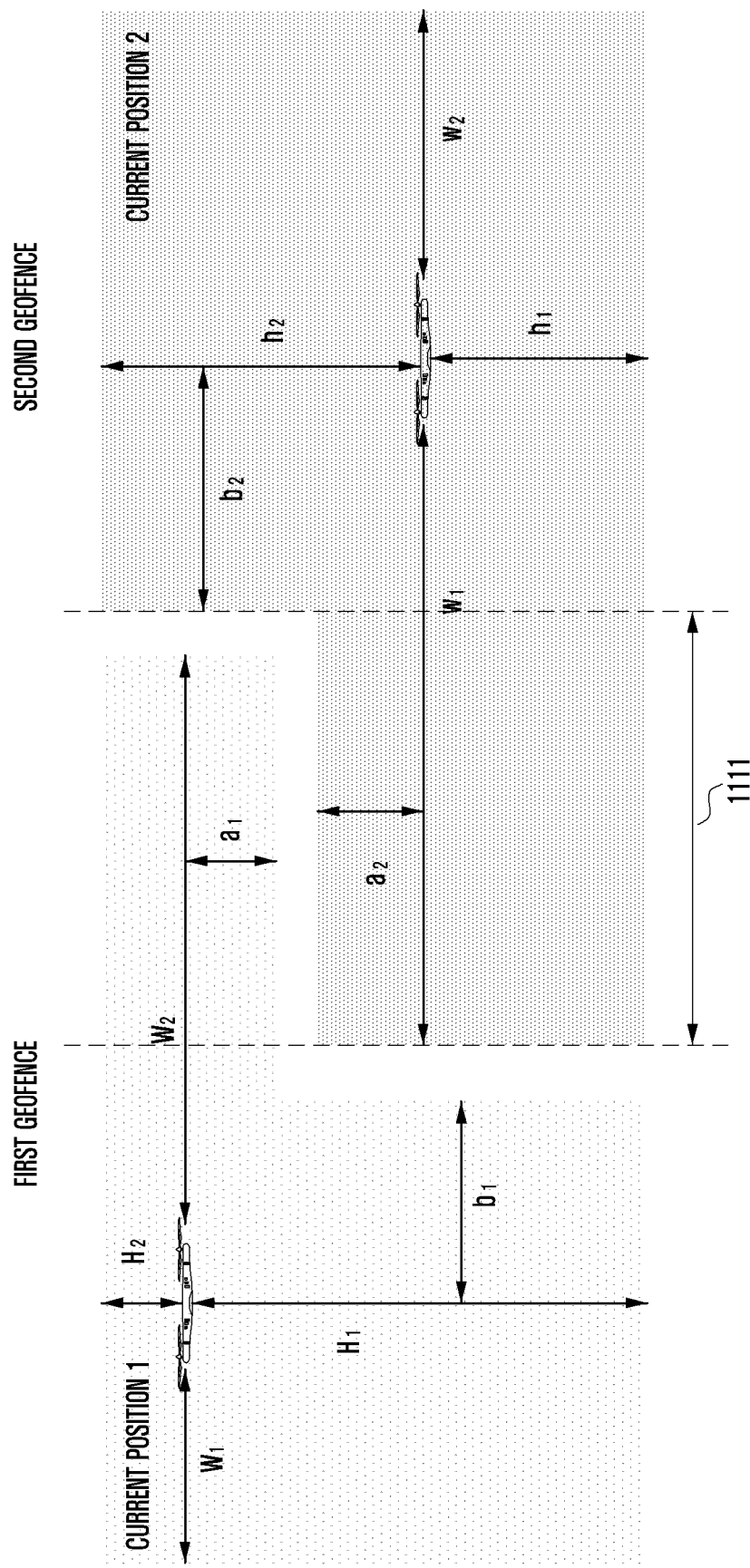
FIG. 11 depicts geofence reconfiguration of unmanned aerial vehicles according to an embodiment of the present disclosure.

FIG. 11 depicts geofence reconfiguration of unmanned aerial vehicles according to an embodiment of the present disclosure.

In FIG. 11, the unmanned aerial vehicle may reconfigure the geofence region by adjusting not only the radial distance but also the flight altitude, thereby preventing an overlap between geofence regions of different unmanned aerial vehicles.

For example, the first geofence region of the first unmanned aerial vehicle may have radial distances W1 and W2 and altitudes H1 and H2 with respect to the center given by the flight position of the first unmanned aerial vehicle. The second geofence region of the second unmanned aerial vehicle may have radial distances w1 and w2 and altitudes h1 and h2 with respect to the center given by the flight position of the second unmanned aerial vehicle. In this case, there may be an overlap zone 1111 between the first geofence region of the first unmanned aerial vehicle and the second geofence region of the second unmanned aerial vehicle.

To prevent a collision, the first unmanned aerial vehicle and the second unmanned aerial vehicle may determine whether there is an overlap zone while in flight on the basis of each other's flight information and reconfigure the geofence regions by changing the flight altitude and/or the radial distance so that no overlap zone occurs.

For example, when the first and second unmanned aerial vehicles fly at the same altitude, they may collide with each other in the overlap zone 1111. However, the first unmanned aerial vehicle can reset the range of its geofence region to fly at a high altitude, and the second unmanned aerial vehicle can reset the range of its geofence region to fly at a low altitude. When the first unmanned aerial vehicle is flying at an altitude H1, it may be allowed to fly up to a radial distance W2; and when the first unmanned aerial vehicle is flying at an altitude h1, it may be allowed to fly up to a radial distance b1.

In contrast, when the second unmanned aerial vehicle is flying at a low altitude h1, it may be allowed to fly up to a radial distance w1; and when the second unmanned aerial vehicle is flying at a high altitude H1, it may be allowed to fly up to a radial distance b2.

As described above, to prevent a collision, the first and second unmanned aerial vehicles can calculate altitude and/or radial distance adjustment values (e.g. a1, a2, b1, b2) for avoiding interference with each other, and reset the range of their geofence regions based on at least one of the calculated adjustment values (e.g. altitude adjustment value or distance adjustment value).

Figure 12:
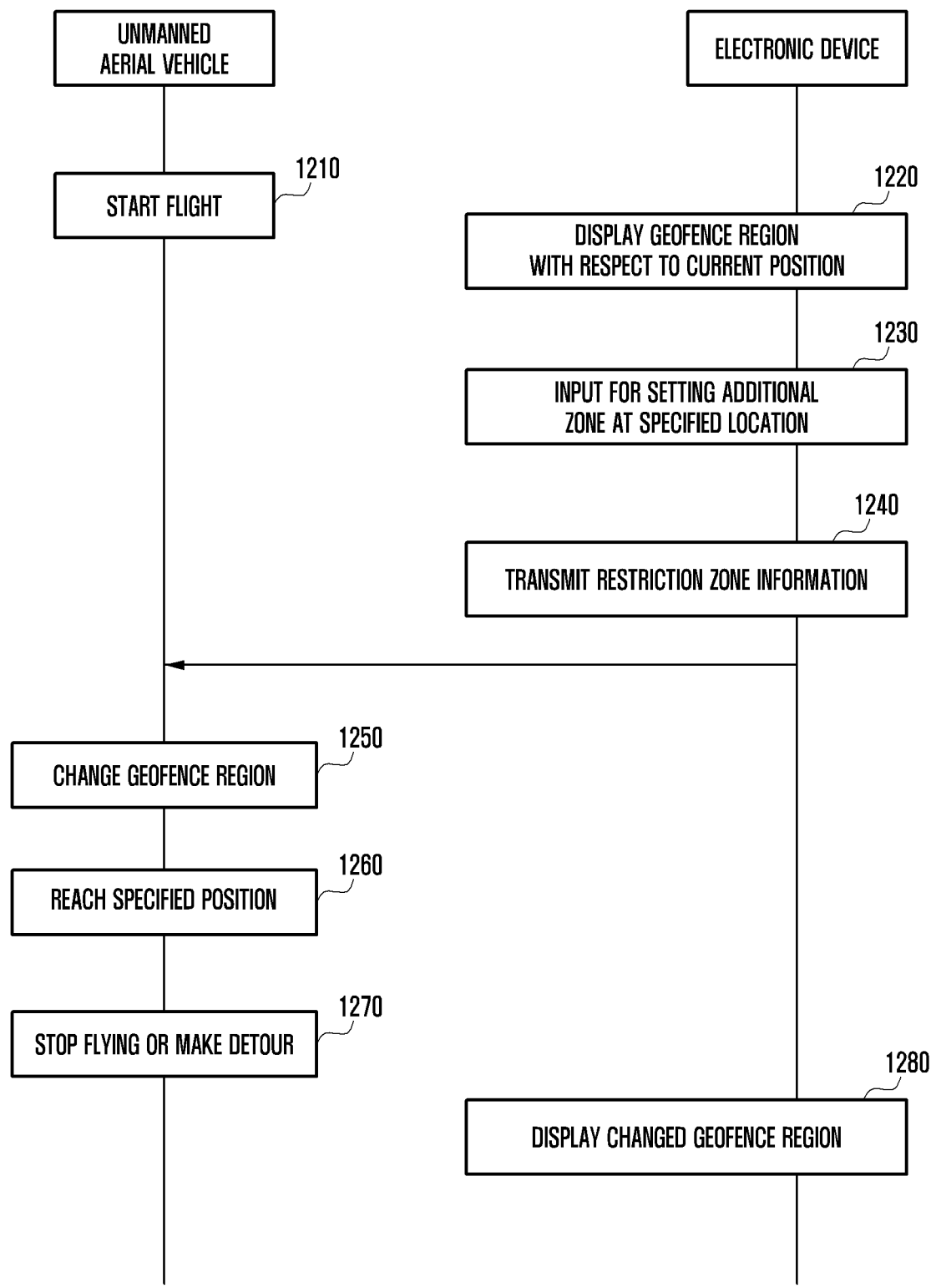
FIG. 12 is a sequence diagram illustrating a geofence reconfiguration method of an unmanned aerial vehicle according to an embodiment of the present disclosure.
Figure 13:
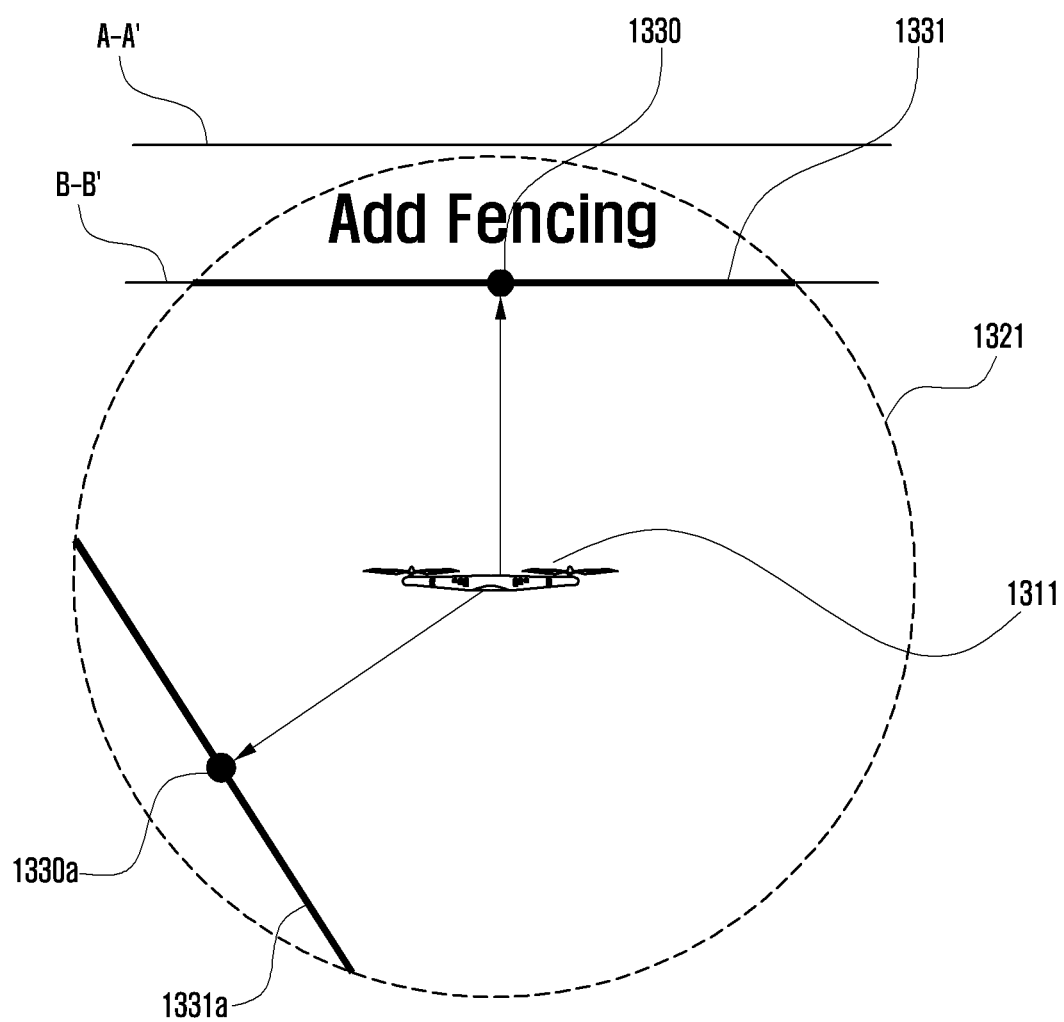
FIG. 13 illustrates a geofence region displayed on the screen of the electronic device according to an embodiment of the present disclosure.

FIG. 12 is a sequence diagram illustrating a geofence reconfiguration method of an unmanned aerial vehicle according to an embodiment of the present disclosure. FIG. 13 illustrates a geofence region displayed on the screen of the electronic device according to an embodiment of the present disclosure.

With reference to FIG. 12, at operation 1210, the unmanned aerial vehicle can start flight according to a control signal from the electronic device. At operation 1220, the electronic device may display, on the display, the geofence region of the unmanned aerial vehicle preset with respect to the current position of the unmanned aerial vehicle. For example, the electronic device can receive images captured by the unmanned aerial vehicle and display the geofence region on the display on the basis of the images received from the unmanned aerial vehicle or map information.

At operation 1230, the electronic device may receive a user input for setting an additional zone at a specific location inside the geofence region.

For example, the electronic device may receive a touch input or key input that specifies a particular location on the GUI screen showing the geofence region. As another example, when a preset button is input, the electronic device can specify a specific location corresponding to the actual position of the unmanned aerial vehicle in flight at the time of the button input.

Alternatively, when the user enters a preset button while the unmanned aerial vehicle is flying at a specific geographic location, the electronic device can specify a specific location corresponding to the actual geographic position of the unmanned aerial vehicle in flight at the time of the button input, and display the specific location corresponding to the actual geographic position on the GUI screen.

At operation 1240, the electronic device may set an additional restriction zone inside the geofence region based on the specified location and notify it to the unmanned aerial vehicle. FIG. 13 is a GUI screen on the electronic device showing the geofence region 1321 of the unmanned aerial vehicle 1311 in flight. For example, the user may touch specific locations 1330 and 1330*a* on the displayed GUI screen. The specified locations 1330 and 1330*a* may correspond to specific geographical positions in which the unmanned aerial vehicle is in flight. The unmanned aerial vehicle in flight can move to the geographical positions corresponding to the specified locations 1330 and 1330*a* and reach the geographical positions.

To set a new restriction zone with respect to the specified location, the electronic device may produce a tangent line A-A' to the geofence region using the unmanned aerial vehicle as the center and produce a secant line B-B' parallel to the tangent line A-A' and passing the specified location. The electronic device may transmit the unmanned aerial vehicle an adjustment value that designates the outer portion of the geofence region relative to the secant line B-B' passing the specified location as an additional restriction zone. In this way, multiple secant lines (e.g. B-B' or 1331*a*) may be produced according to user requests, and various restriction zones based on the secant lines may be added to the initial geofence region.

At operation 1250, the unmanned aerial vehicle may change the range of the geofence region according to the received adjustment value. At operation 1260, the unmanned aerial vehicle in flight may reach the specified location designated by the user input. At operation 1270, the unmanned aerial vehicle may be forced to stop flying or may make a detour so as not to enter the restriction zone.

Meanwhile, at operation 1280, the electronic device may identify the changed geofence region of the unmanned aerial vehicle and display the changed geofence region or the added restriction zone on the display, providing the user with the changed information.

Figure 14:
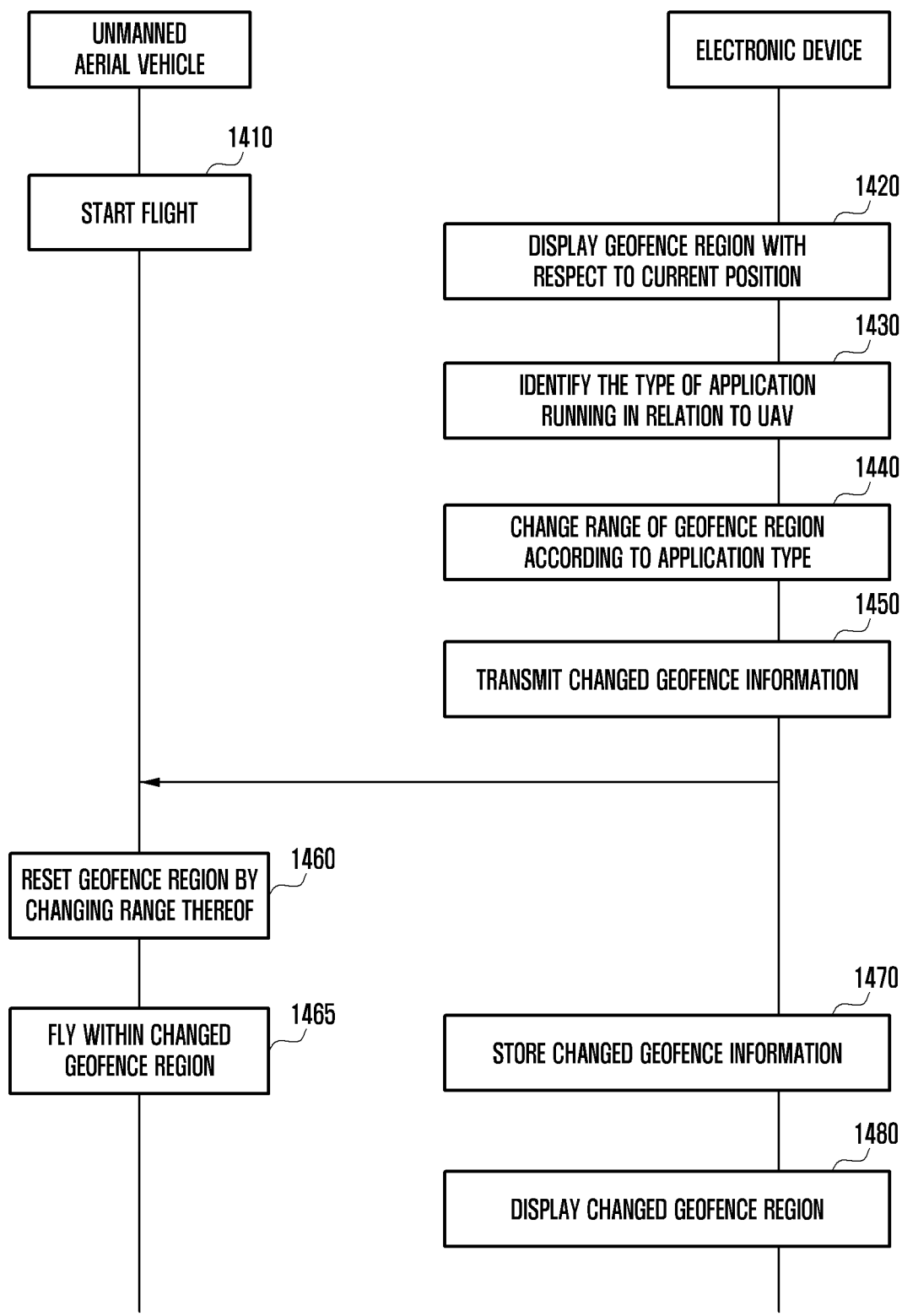
FIG. 14 is a sequence diagram illustrating a geofence reconfiguration method of an unmanned aerial vehicle according to an embodiment of the present disclosure.

FIG. 14 is a sequence diagram illustrating a geofence reconfiguration method of an unmanned aerial vehicle according to an embodiment of the present disclosure.

With reference to FIG. 14, at operation 1410, the unmanned aerial vehicle can start flight according to a control signal from the electronic device. At operation 1420, the electronic device may display the geofence region preset with respect to the current position of the unmanned aerial vehicle on the display.

At operation 1430, the electronic device may identify the type of an application that is running in relation to the unmanned aerial vehicle.

The electronic device can classify applications by type in relation to the unmanned aerial vehicle and support the function of changing the geofence region according to the application type. For example, applications may be classified by distance into three types: short range, medium range, and long range. For instance, a camera application may be a short range application, and a user tracking application may be a medium range application.

At operation 1440, the electronic device may determine an adjustment value for resetting the range of the geofence region in accordance with the application type. At operation 1450, the electronic device may transmit the adjustment value for reconfiguration to the unmanned aerial vehicle. At operation 1460, the unmanned aerial vehicle may reset the geofence region by changing the range of the geofence region based on the adjustment value received from the electronic device. At operation 1465, the unmanned aerial vehicle may fly within the changed geofence region.

Meanwhile, at operation 1470, the electronic device may store information on the changed geofence region of the unmanned aerial vehicle. At operation 1480, the electronic device may display the changed geofence region on the display, providing the user with the changed information.

In the description, the word "module" may refer to a software component, a hardware component, a firmware component or a combination thereof. "Module" may be used interchangeably with "unit", "logic", "logical block", "component", "circuit" or the like. A module may be a smallest element or a part thereof acting as a single entity. A module may be a smallest element or a part thereof supporting one or more functions. A module may be implemented mechanically or electronically. For example, a module having a specific function may be implemented using at least one of an application-specific integrated circuit (ASIC), a field-programmable gate array (FPGA) and a programmable-logic device (PLD), known to have a specific function or to be developed in the future. At least a part of the device (e.g. modules or functions) or the method (e.g. operations) according to various embodiments may be implemented as instructions in the form of a program module, which can be stored in a computer readable storage medium (e.g. memory 130). When the instructions are executed by a processor (e.g. processor 120), the processor may carry out functions corresponding to the instructions. The computer readable storage media may include magnetic media such as a hard disk and floppy disk, optical media such as a CD-ROM and DVD, magneto-optical media such as a floptical disk, and memory devices. The instructions may include codes produced by compilers and codes executable through interpreters. A module or program module may include at least one of the components described above. An existing component of the module may be removed or a new component may be added to the module. Operations supported by a module, program module, or another component may be carried out in sequence, in parallel, by repetition, or heuristically. Some operations may be executed in a different order or may be omitted, and a new operation may be added.

What is claimed is:

1. An unmanned aerial vehicle (UAV) comprising:
 a camera;
 a movement control module including a propeller;
 a sensor module configured to sense nearby surroundings;
 a wireless communication module configured to wirelessly communicate with an external communication device; and
 a processor electrically connected to the camera, the sensor module, and the wireless communication module;
 wherein the processor, when the UAV is in flight, is configured to:
 identify a first geofence region preset in accordance with a current position of the UAV,
 receive flight information from a second UAV during the flight indicating a second geofence region of the second UAV,
 determine whether there is an overlap between the first geofence region and the second geofence region, and
 based on the determination that there is an overlap between the first geofence region and the second geofence region, reset the first geofence region so that the first geofence region does not overlap with the second geofence region during the flight.

2. The unmanned aerial vehicle of claim 1, wherein the flight information of the UAV or the second UAV comprises information regarding flight positon, flight direction, flight velocity, and respective flight geofence region.

3. The unmanned aerial vehicle of claim 1, wherein the processor is further configured to reset the first geofence region based on an adjustment value for at least one of a radial distance and a flight altitude of the first geofence region.

4. The unmanned aerial vehicle of claim 1, wherein the processor is further configured to:
 periodically broadcast flight information;
 determine, when flight information is received through the wireless communication module from the second UAV positioned within a given distance from the first geofence region, an adjustment value for at least one of a radial distance and a flight altitude of the first geofence region so that the first geofence region does not overlap with the second geofence region of the second UAV; and
 reset the first geofence region by changing the first geofence region based on the determined adjustment value.

5. The unmanned aerial vehicle of claim 1, wherein the processor is further configured to:
 receive flight information through the wireless communication module from the second UAV positioned within a given distance from the first geofence region;
 perform, based on the determination that there is an overlap between the first geofence region and a second geofence region of the second UAV, a negotiation process with the second UAV through wireless communication; and
 determine adjustment values for changing at least one of the first geofence region and the second geofence region through negotiations.

6. The unmanned aerial vehicle of claim 1, wherein the processor is further configured to:
 transmit, based on the determination that unable to determine whether the first geofence region overlaps with the second geofence region, the flight information of the UAV to a geofence server;
 receive an adjustment value for at least one of a radial distance and a flight altitude of the first geofence region from the geofence server; and
 reset the first geofence region based on the received adjustment value.

7. The unmanned aerial vehicle of claim 1, wherein the processor is further configured to:
 receive, when unable to determine whether the first geofence region overlaps the second geofence region, an adjustment value for at least one of a radial distance and a flight altitude of the first geofence region from an electronic device providing a control signal to the UAV; and
 reset the first geofence region based on the received adjustment value.

8. The unmanned aerial vehicle of claim 1, wherein the processor is further configured to:
 specify, when setting information for adding a restriction zone to the first geofence region is received from an electronic device providing a control signal to the UAV, a position corresponding to the setting information within the first geofence region; and
 reset the first geofence region by designating a zone derived from the specified position as a flight restriction zone.

9. The unmanned aerial vehicle of claim 1, wherein the processor is further configured to reset, if a flight altitude of the UAV is equal to the flight altitude of the second UAV, the first geofence region by changing the flight altitude of the UAV so that the UAV and the second UAV can fly at different altitudes.

10. The unmanned aerial vehicle of claim 1, wherein the processor is further configured to transmit, to notify a user of a change in the first geofence region when the first geofence region is changed through resetting, information on the changed first geofence region to an electronic device controlling the unmanned aerial vehicle.

11. A method in an unmanned aerial vehicle (UAV), the method comprising:
broadcasting flight information through a wireless communication module of the UAV on a periodic basis when the UAV is in flight in response to a flight control signal;
determining, using a processor of the UAV, based on flight information of a second UAV received in flight, whether there is an overlap between a first geofence region preset in accordance with a flight position of the UAV and a second geofence region of the second UAV; and
based on the determination that there is an overlap between the first geofence region and the second geofence region, resetting, by the processor, the first geofence region so that the first geofence region does not overlap with the second geofence region during the flight.

12. The method of claim 11, wherein the flight information of the UAV comprises information regarding at least one of flight positon, flight direction, flight velocity, and flight geofence region of the UAV.

13. The method of claim 11, wherein determining whether there is an overlap comprises:
receiving the flight information from a second UAV positioned within a given distance from the first geofence region having a first radius;
comparing the first geofence region with a second geofence region of the UAV to find an overlap region; and
determining a radial distance less than the first radius, so that the overlap region is excluded from the first geofence region,
wherein resetting the first geofence region includes changing the first geofence region based on the determined radial distance.

14. The method of claim 11, wherein resetting the first geofence region comprises resetting the first geofence region on based on an adjustment value for at least one of a radial distance and a flight altitude of the first geofence region.

15. The method of claim 11, wherein determining whether there is an overlap comprises:
receiving the flight information from a second UAV positioned within a given distance from the first geofence region;
performing, based on the determination that there is an overlap between the first geofence region and the second geofence region of the second UAV, a negotiation process with the second UAV through wireless communication; and
determining adjustment values for changing at least one of the first geofence region and the second geofence region through negotiations.

16. The method of claim 11, wherein determining whether there is an overlap comprises:
transmitting, when unable to determine whether the first geofence region overlaps the second geofence region, the flight information of the UAV to a geofence server; and
receiving an adjustment value for at least one of a radial distance and a flight altitude of the first geofence region from the geofence server,
wherein the first geofence region is reset based on the received adjustment value.

17. The method of claim 11, wherein determining whether there is an overlap comprises receiving, when unable to determine whether the first geofence region overlaps the second geofence region, an adjustment value for at least one of a radial distance and a flight altitude of the first geofence region from an electronic device providing a control signal to the UAV, and wherein the first geofence region is reset based on the received adjustment value.

18. The method of claim 11, wherein resetting the first geofence region comprises:
receiving setting information for adding a restriction zone to the first geofence region from an electronic device providing a control signal to the UAV; and
specifying a particular position corresponding to the setting information within the first geofence region and resetting the first geofence region by designating a zone derived from the specified position as a flight restriction zone.

19. The method of claim 11, wherein resetting the first geofence region comprises resetting, when a flight altitude of the UAV is equal to a flight altitude of the second UAV, the first geofence region by changing the flight altitude of the UAV so that the UAV and the second UAV can fly at different altitudes.

20. The method of claim 11, wherein resetting the first geofence region further comprises transmitting, to notify a user of a change in the first geofence region when the first geofence region is changed through resetting, information on the changed first geofence region to an electronic device controlling the unmanned aerial vehicle.

* * * * *